(12) United States Patent
Okitsu et al.

(10) Patent No.: US 8,979,293 B2
(45) Date of Patent: Mar. 17, 2015

(54) LIGHTING DEVICE, DISPLAY DEVICE, AND TELEVISION DEVICE

(75) Inventors: Motoaki Okitsu, Osaka (JP); Yuki Horiguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 154 days.

(21) Appl. No.: 13/818,133

(22) PCT Filed: Sep. 16, 2011

(86) PCT No.: PCT/JP2011/071187
§ 371 (c)(1),
(2), (4) Date: Feb. 21, 2013

(87) PCT Pub. No.: WO2012/039348
PCT Pub. Date: Mar. 29, 2012

(65) Prior Publication Data
US 2013/0148039 A1   Jun. 13, 2013

(30) Foreign Application Priority Data
Sep. 24, 2010   (JP) ................. 2010-213828

(51) Int. Cl.
*G09F 13/04* (2006.01)
*F21V 15/01* (2006.01)
*G02F 1/1335* (2006.01)

(52) U.S. Cl.
CPC ............. *F21V 15/01* (2013.01); *G09F 13/04* (2013.01); *G02F 1/133603* (2013.01); *G02F 1/133608* (2013.01); *G02F 2001/133612* (2013.01)
USPC .......... 362/97.2; 362/97.1; 362/97.3

(58) Field of Classification Search
CPC .... F21V 15/01; G02F 1/133603; G09F 13/04
USPC .................. 362/97.1, 97.2, 97.3
See application file for complete search history.

(56) References Cited

U.S. PATENT DOCUMENTS

2008/0137002 A1   6/2008   Takata
2009/0135330 A1*  5/2009   Kawase et al. ............ 349/58
(Continued)

FOREIGN PATENT DOCUMENTS

CN   101253445 A   8/2008
JP   2007-227210 A   9/2007
(Continued)

OTHER PUBLICATIONS

Official Communication issued in International Patent Application No. PCT/JP2011/071187 mailed on Dec. 20, 2011.

*Primary Examiner* — Stephen F Husar
(74) *Attorney, Agent, or Firm* — Keating & Bennett, LLP

(57) ABSTRACT

An object of the present invention is to provide a lighting device in which a problem is hardly caused by a hole formed in a chassis of the lighting device. A backlight unit (a lighting device) 1 according to the present invention includes an LED (a light source) 17, a flat cable (a flat conductor) 22 connected to the LED 17, a chassis 14 including a hole 14*e*, a cable protector (a flat conductor protector) 23 including a protection portion 24 and an insertion hole 24*a* extending through the protection portion 24. The chassis 14 houses the LED 17. The flat cable 22 is inserted through the insertion hole 24*a*. The flat conductor protector 23 is arranged such that the protection portion 24 is positioned between an edge of the hole 14*e* of the chassis 14 and a portion of the flat cable 22 that is positioned in the insertion hole 24*a*.

19 Claims, 30 Drawing Sheets

(56) References Cited

U.S. PATENT DOCUMENTS

| | | |
|---|---|---|
| 2010/0008069 A1 | 1/2010 | Takata |
| 2010/0134711 A1 | 6/2010 | Park |
| 2010/0157576 A1 | 6/2010 | Takata |
| 2011/0134371 A1 | 6/2011 | Shimojoh et al. |
| 2011/0149553 A1 | 6/2011 | Takata |
| 2012/0002398 A1 | 1/2012 | Takata |

FOREIGN PATENT DOCUMENTS

| | | |
|---|---|---|
| JP | 2007-305742 A | 11/2007 |
| JP | 2010-501980 A | 1/2010 |
| WO | 2010/026810 A1 | 3/2010 |

* cited by examiner

FIG.1
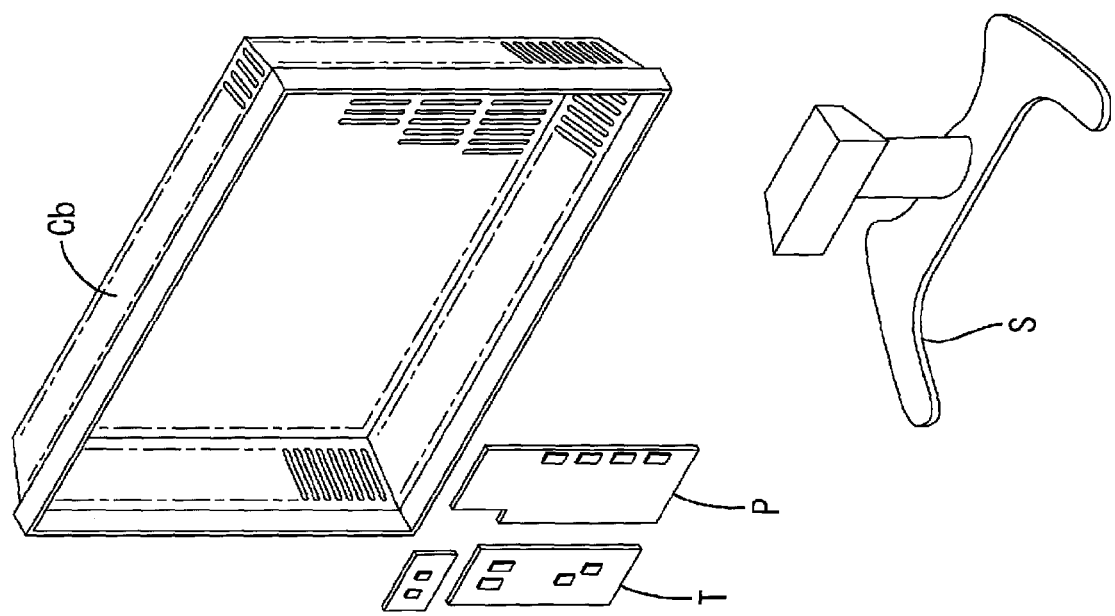
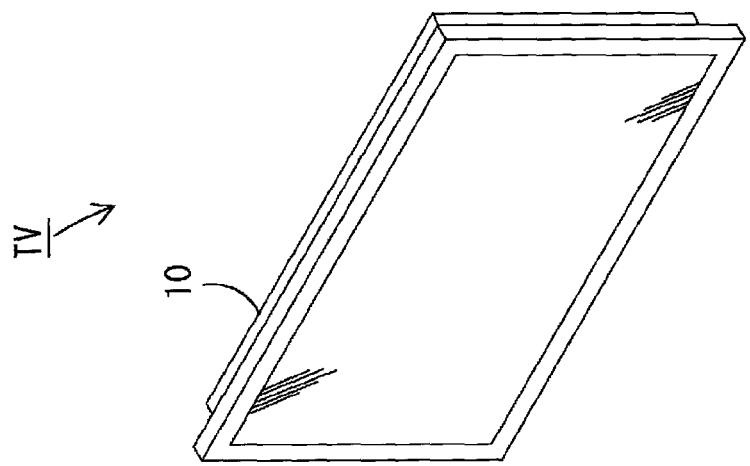
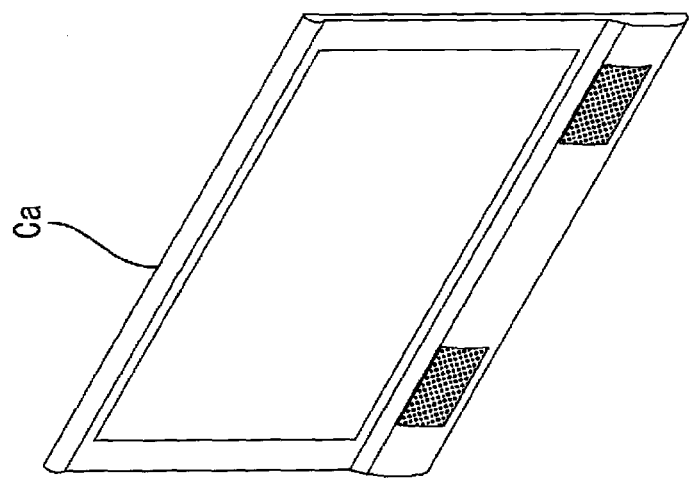

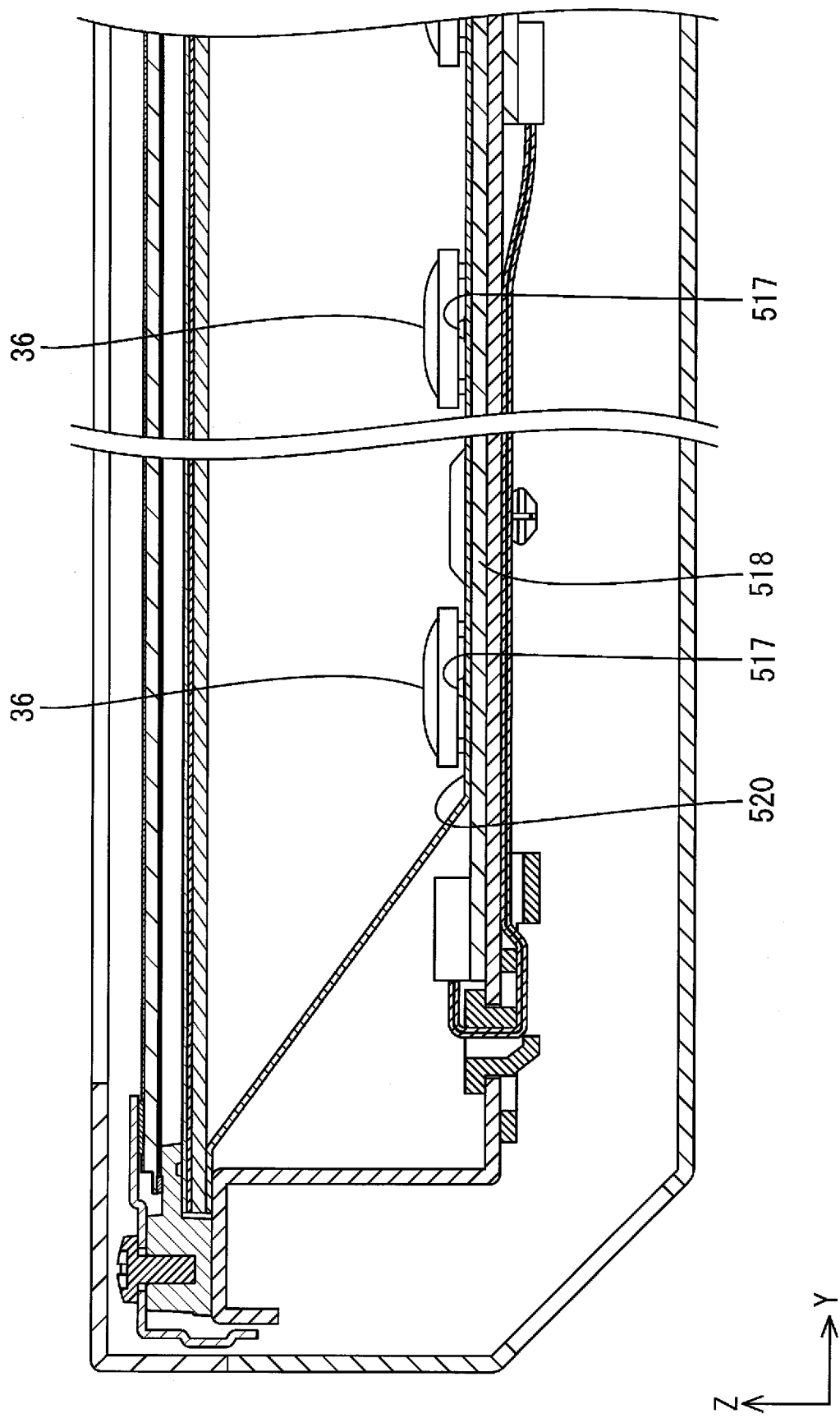

LIGHTING DEVICE, DISPLAY DEVICE, AND TELEVISION DEVICE

TECHNICAL FIELD

The present invention relates to a lighting device, a display device, and a television device.

BACKGROUND ART

For example, a liquid crystal panel used for a liquid crystal display device such as a liquid crystal television does not emit light, and thus a backlight unit is required as a separate lighting device. The backlight unit is arranged behind the liquid crystal panel (on a side opposite to a display surface side). The backlight unit includes a chassis having an opening on the side close to the liquid crystal panel, light sources housed in the chassis, a reflection sheet arranged along an inner surface of the chassis to reflect light toward the opening of the chassis, and an optical member (such as a diffuser sheet) provided in the opening of the chassis to effectively exit light emitted from the light source toward the liquid crystal panel side. If LEDs are used as the light sources included in the backlight unit, an LED board on which the LEDs are mounted is housed in the chassis.

The backlight unit including the LEDs as the light sources described in Patent Document 1 below is known, for example.

RELATED ART DOCUMENT

Patent Document

Patent Document 1: Japanese Unexamined Patent Publication No. 2007-305742

Problem to be Solved by the Invention

To supply power to the LED board housed in the chassis, an end of a flat cable such as FFC may be connected to a connector mounted on the LED board, and the other end of the flat cable may be drawn through a hole in the chassis to the outside. In such a case, if the hole has a sharp edge, the flat cable may be damaged by the edge, for example. Additionally, the light in the chassis may leak out through the hole.

DISCLOSURE OF THE PRESENT INVENTION

The present invention was accomplished in view of the above circumstances. It is an object of the present invention to solve problems caused by the hole in the chassis.

Means for Solving the Problem

A lighting device according to the present invention includes a light source, a flat conductor connected to the light source, a chassis including a hole, and a flat conductor protector including a protection portion and an insertion hole extending through the protection portion. The chassis houses the light source. The flat conductor is inserted through the insertion hole. The flat conductor protector is arranged such that the protection portion is positioned between an edge of the hole in the chassis and a portion of the flat conductor that is positioned in the insertion hole.

In this configuration, the insertion hole is formed in the protection portion of the flat conductor protector that is arranged to pass through the hole in the chassis. The flat conductor connected to the light source housed in the chassis is drawn through the insertion hole to the outside of the chassis. Additionally, the protection portion is arranged between the portion of the flat conductor that is positioned in the insertion hole and the edge of the hole, and thus the flat conductor is not in direct contact with the edge portion of the hole. With this configuration, the flat conductor is hardly damaged, for example. Further, the insertion hole in the protection portion has an opening that is smaller than that of the hole. Accordingly, the light from the light source in the chassis hardly leaks from the chassis and dusts outside the chassis hardly enter the chassis. Compared with the case in which an adhesion tape or the like is attached to the edge portion of the hole to prevent the problem, this configuration has improved disassembly workability in repairing or scraping.

The following configurations may be preferably employed as embodiments of the present invention.

(1) The flat conductor protector may further include a pressing portion. The pressing portion presses a portion of the flat conductor that is positioned outside the chassis toward the chassis. In this configuration, the portion of the flat conductor that is positioned outside the chassis is pressed to the chassis by the pressing portion, and thus the flat conductor hardly loosens.

(2) The portion of the flat conductor that is positioned outside the chassis may be a linear portion extending in one direction. The pressing portion may include two pressing portions. The flat conductor protector may be arranged such that each of the pressing portions is positioned at each end in a width direction of the linear portion of the flat conductor. In this configuration, the flat conductor is pressed at each end in the width direction by each of the pressing portions, and thus the flat conductor hardly loosens.

(3) The flat conductor protector may further include a flange. The flange may protrude from an outer surface of the protection portion and may face an edge portion of the hole. The pressing portion may extend from the flange. In this configuration, the flange protruding from the outer surface of the protection portion faces the edge portion of the hole in the chassis, and thus the light hardly leaks through the space between the edge of the hole and the protection portion and the dusts or the like hardly enters the space. Further, the pressing portion extends from the flange, and thus the arrangement of the pressing portion can be freely determined compared with the case that the pressing portion is provided on the protection portion. For example, the pressing portion can be positioned away from the protection portion.

(4) The flange may be in contact with the edge portion of the hole on an outer surface of the chassis. The pressing portion may be arranged at a position not overlapping with the flange in a plan view. In this configuration, the flange is brought into contact with the edge portion of the hole from the outside of the chassis. This improves attachment and detachment workability of the flat conductor protector. Further, the flat conductor arranged outside the chassis through the insertion hole includes a portion extending along the flange, but the pressing portion arranged at the position not overlapping with the flange in a plan view presses the flat conductor between the pressing portion and the cassis without the flange therebetween. This effectively reduces the loosening of the flat conductor.

(5) The pressing portion is arranged such that the flat conductor is bent between the flange and the pressing portion. In this configuration, the pressing portion can press the flat conductor with the flat conductor bent between the pressing portion and the flange, and thus the flat conductor can have suitable tension. This properly reduces the loosening of the flat conductor.

(6) The flat conductor protector may further include a guiding portion. The guiding portion may be positioned outside the chassis at a position overlapping with the insertion hole. The flat conductor to be drawn to an outside of the chassis through the insertion hole may be guided by the guiding portion in a specific direction. In this configuration, the guiding portion, which is arranged at the position overlapping with the insertion hole, guides the flat conductor to be drawn to the outside of the chassis through the insertion hole, and thus the flat conductor can be drawn easily. Additionally, the guiding portion arranged at the position overlapping with the insertion hole in a plan view can properly reduce the leakage of light from the insertion hole and the entrance of the dusts outside the chassis into the insertion hole.

(7) The guiding portion may extend from the protection portion. The guiding portion may have an inner surface continuously extending from an inner surface of the insertion hole. In this configuration, the inner surface of the guiding portion is continuous with the inner surface of the insertion hole, and thus the flat conductor can be bent along the inner surfaces of the guiding portion and the insertion hole. This facilitates drawing of the flat conductor.

(8) The flat conductor may be drawn in a vertical direction. The guiding portion and the edge portion of the insertion hole may constitute an outlet from which the flat conductor is drawn out. The outlet may open downward in the vertical direction. In this configuration, the outlet opens downward in the vertical direction, and thus the dusts or the like outside the chassis hardly enters the chassis through the outlet. Further, even if the light leaks from the outlet, a viewer may not notice the leaked light.

(9) The light source may include a plurality of light sources. The lighting device may further include a light source board on which the light sources are mounted and to which the flat conductor is connected. With this configuration, the power can be supplied to the light sources mounted on the light source board by connecting the flat conductor to the light source board.

(10) The flat conductor may include a plurality of conducting bodies arranged parallel to each other. One of the conducting bodies and another one of the conducting bodies may be each connected to a separate one of the light sources. In this configuration, some of the conducting bodies are connected to separate light sources, and thus the brightness or the like of the light sources can be independently controlled for each conducting body.

(11) The light source board may include a first light source board and a second light source board in the chassis. The first light source board and the second light source board may be electrically connected to each other to constitute one light source board group. The flat conductor may be connected to at least one of the first light source board and the second light source board. The flat conductor may include a plurality of conducting bodies arranged parallel with each other. One of the conducting bodies may be connected to the light sources arranged on the first light source board, and another one of the conducting bodies may be connected to the light sources arranged on the second light source board. In this configuration, the conducting bodies include the conducting body that is connected to the light source arranged on the first light source board and the conducting body that is connected to the light source arranged on the second light source board, and thus the brightness and the like of the light sources on each light source board can be independently controlled through each conducting body.

(12) The flat conductor protector may further include a flange. The flange may protrude from an outer surface of the protection portion and face the edge portion of the hole. In this configuration, the flange protruding from the outer surface of the protection portion faces the edge portion of the hole in the chassis, and thus the light hardly leaks through the space between the edge of the hole and the protection portion and the dusts or the like hardly enters the space.

(13) The flange may be in contact with the edge portion of the hole on an outer surface of the chassis. In this configuration, the flange is brought into contact with the edge portion of the hole. This facilitates the attachment and detachment of the flat conductor protector.

(14) The flat conductor protector may further include a holding portion. The holding portion may be arranged on an outer surface of the protection portion such that the holding portion holds the edge portion of the hole in the chassis between the holding portion and the flange. In this configuration, the edge portion of the hole is held between the holding portion and the flange, and thus the flat conductor protector can be fixed to the chassis.

(15) The flat conductor protector may be selectively positioned at one of a non-holding position and a holding position by being slid in a direction along a plate surface of the chassis. When the flat conductor protector is positioned at the non-holding position, the holding portion is away from the edge portion of the hole of the chassis. When the flat conductor protector is positioned at the holding position, the holding portion is held against the edge portion of the hole of the chassis. In this configuration, when the flat conductor protector at the non-holding position is slid along the plate surface of the chassis to the holding position, the holding portion is held against the edge portion of the hole of the chassis, and the edge portion of the hole is held between the holding portion and the flange. Thus, the flat conductor protector can be fixed to the chassis. When the flat conductor protector at the holding position is detached from the chassis, the cable protector is slid to the non-holding position along the direction opposite from the attachment. Thus, the flat conductor protector can be detached from the chassis. Accordingly, the workability for attachment and detachment of the flat conductor protector is high.

(16) The holding portion may protrude from the outer surface of the protection portion in a direction intersecting with a sliding direction in which the flat conductor protector is slid. The chassis may further include a holding portion insertion hole in the edge portion of the hole. The holding portion insertion hole and the hole may be communicated with each other. When the flat conductor protector is positioned at the non-holding position, the holding portion is positioned in the holding portion insertion hole. On the other hand, when the flat conductor protector is positioned at the holding position, the holding portion is away from the holding portion insertion hole and held against the edge portion of the hole. Compared with the case that the holding portion protrudes from the outer surface of the protection portion in the sliding direction of the protection portion, the arrangement and the number of the holding portions on the holding portion can be freely determined.

(17) The flat conductor protector may further include a stopper. The stopper may be provided on the flange. When the flat conductor protector is positioned at the non-holding position, the stopper may be positioned outside the hole. When the flat conductor protector is positioned at the holding position, the stopper may be positioned in the hole and may be held against an inner surface of the hole, whereby the flat conductor protector is not allowed to be moved in a direction opposite to a sliding direction for attachment in which the flat conductor protector is slid so as to be attached to the chassis.

In this configuration, when the flat conductor protector is slid from the non-holding position to the holding position, the stopper is positioned in the hole and held against the inner surface of the hole, and thus the flat conductor protector is not allowed to be moved in the direction opposite to the sliding direction for attachment in which the flat conductor protector is slid so as to be attached to the chassis.

(18) The flange may include a cutout such that the flange includes a side portion having a fixed end and a free end. The stopper may be provided on the side portion. In this configuration, when the flat conductor protector is positioned at the non-holding position, the stopper is positioned outside the hole, but the side portion positioned outside the hole is elastically deformed when the stopper comes in contact with the chassis, because the side portion on which the stopper is provided has the free end. Then, when the flat conductor protector is slid to the holding position, the side portion is restored such that the stopper is positioned in the hole and held against the inner surface of the hole. Thus, the flat conductor protector is fixed.

(19) The flat conductor protector may be pushed against the chassis in a direction intersecting with a plate surface of the chassis, whereby the flat conductor protector is fixed to the chassis. In this configuration, the flat conductor protector is pushed in the direction intersecting with the plate surface of the chassis, and thus the edge portion of the hole is held between the flange and the holding portion. This enables the flat conductor protector to be fixed to the chassis. If the flat conductor protector is attached to the chassis by being slid in the direction along the plate surface of the chassis, the hole needs to have a larger diameter than the outer diameter of the protection hole. However, this is not required for above configuration, and thus the hole can be relatively small. Accordingly, the leakage of light and the entrance of dusts hardly occur.

(20) The flat conductor protector may further include an elastically deformable elastic piece. The elastic piece may protrude from the flange toward the chassis. In this configuration, when the flat conductor protector is attached or detached with respect to the chassis, the elastic piece can be elastically deformed, and thus the holding portion can be easily positioned in the hole. This improves the attachment and detachment workability of the flat conductor protector with respect to the chassis.

Next, to solve the above problem, a display device according to the present invention may include the above lighting device and a display panel configured to provide display using light from the lighting device.

According to the above display device, the lighting device supplying light to the display panel can solve the problems caused by the hole in the chassis, and thus display reliability and display quality can be improved.

The display panel may be a liquid crystal panel. The display device as a liquid crystal display device has a variety of applications, such as a television display or a personal-computer display. Particularly, it is suitable for a large screen display.

Advantageous Effect of the Invention

According to the present invention, the problems caused by the hole in the chassis can be solved.

BRIEF DESCRIPTION OF THE DRAWINGS

FIG. 1 is an exploded perspective view illustrating a general configuration of a television device according to the first embodiment of the present invention;

FIG. 30 is a cross-sectional view of the liquid crystal display device taken along the short-side direction, the flat cable and the cable protector being magnified.

MODE FOR CARRYING OUT THE INVENTION

First Embodiment

A first embodiment of the present invention is described with reference to FIG. 1 to FIG. 20. In this embodiment, a liquid crystal display device 10 is described. An X-axis, a Y-axis and a Z-axis are described in some of the drawings, and a direction of each axial direction corresponds to a direction described in each drawing. The Y-axis direction and the X-axis direction, respectively, correspond to a vertical direction and a horizontal direction. The description of upper and lower side is based on the vertical direction unless otherwise specified. Additionally, the upper side in FIG. 4 and FIG. 5 corresponds to a front side, and the lower side therein corresponds to a rear side.

Figure 4:
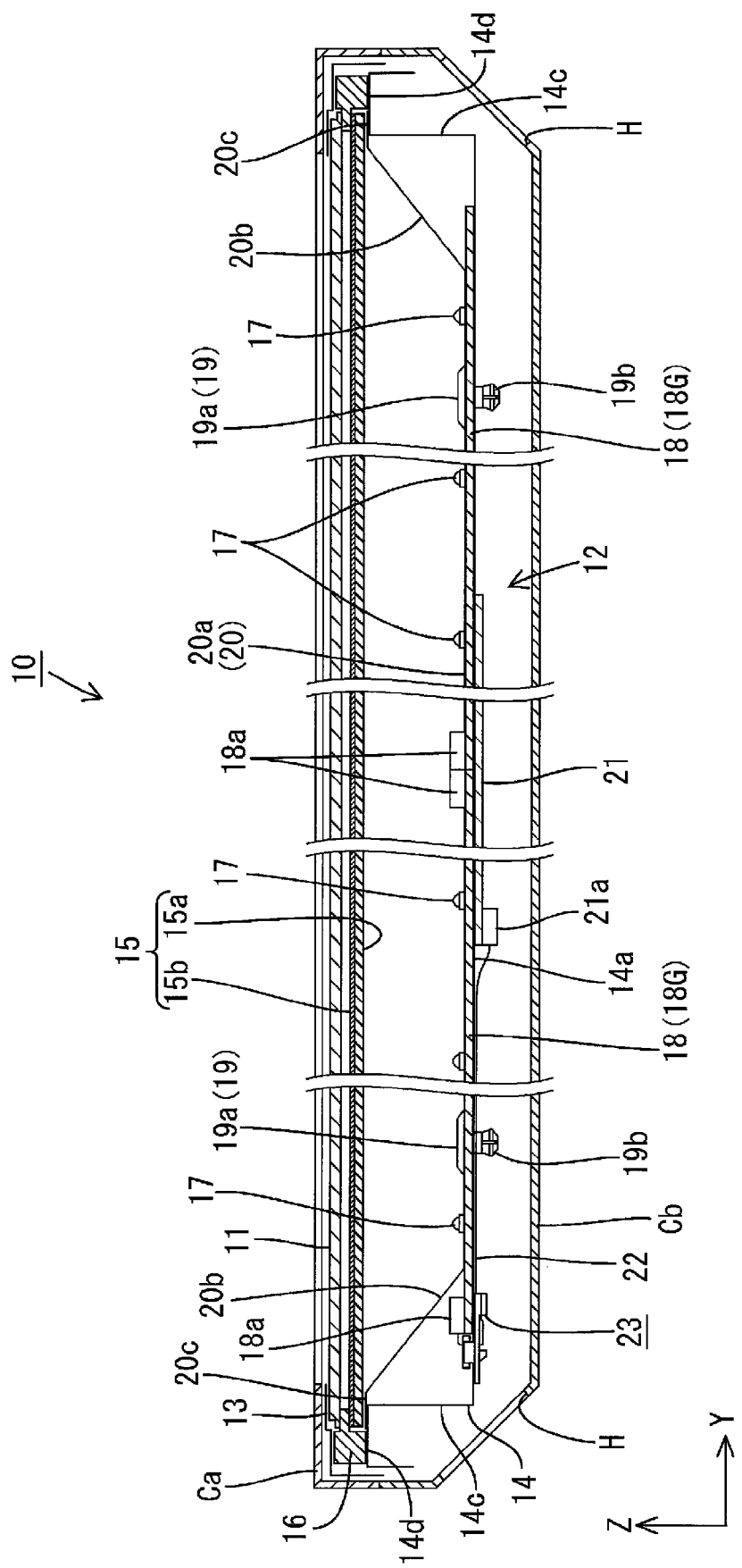
FIG. 4 is a cross-sectional view of the liquid crystal display device taken along a short side direction thereof.
Figure 5:
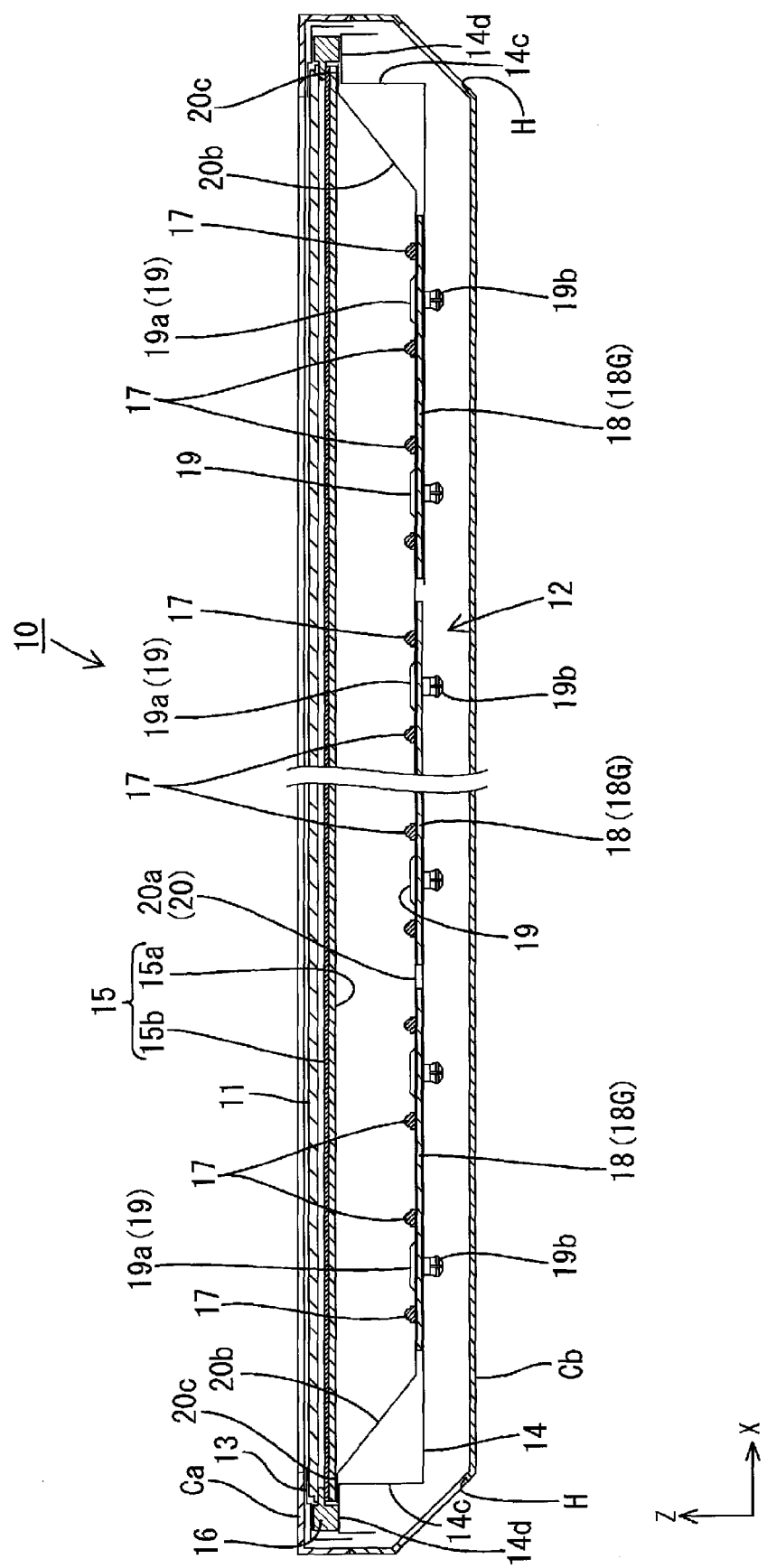
FIG. 5 is a cross-sectional view of the liquid crystal display device taken along a long-side direction thereof.

As illustrated in FIG. 1, a television device TV according to this embodiment includes a liquid crystal display device 10, front and back cabinets Ca and Cb, a power supply P, and a tuner T. The front and back cabinets Ca and Cb sandwich, and thus house the liquid crystal display device 10. The liquid crystal display device (display device) 10 has a landscape quadrangular shape (elongated, rectangular shape) as a whole. The liquid crystal display device 10 is housed in a vertical position such that a display surface thereof extends along the vertical direction (the Y-axis direction). The television device TV is supported by a stand (support member) 26 which will be described later such that a display surface of the liquid crystal display device 10 extends in the vertical direction (the Y-axis direction). The cabinet Ca, Cb arranged on the rear side has dissipation holes H to release heat at predetermined positions (FIG. 4 and FIG. 5).

Herein, the phrase "the display surface of the liquid crystal panel 10 extends along the vertical direction" refers not only the state that the display surface of the liquid crystal panel 10 is in the vertical position, but also refers to the state that the display surface is set in a position closer to the vertical position than the horizontal position. The display surface may be tilted at 0 to 45 degrees, preferably 0 to 30 degrees, with respect to the vertical direction.

Next, a liquid crystal panel 11 and a backlight unit 12 included in the liquid crystal display device 10 will be described in this order. The liquid crystal panel (display panel) 11 has a landscape quadrangular shape in a plan view and is configured such that a pair of glass substrates is bonded together with a predetermined gap therebetween and liquid crystal is sealed between the glass substrates. On one of the glass substrates, switching components (for example, TFTs) connected to source lines and gate lines which are perpendicular to each other, pixel electrodes connected to the switching components, and an alignment film and the like are provided. On the other substrate, color filters having color sections such as red (R), green (G) and blue (B) color sections arranged in a predetermined pattern, counter electrodes, and an alignment film and the like are provided. Polarizing plates are attached to outer surfaces of the substrates.

Figure 2:
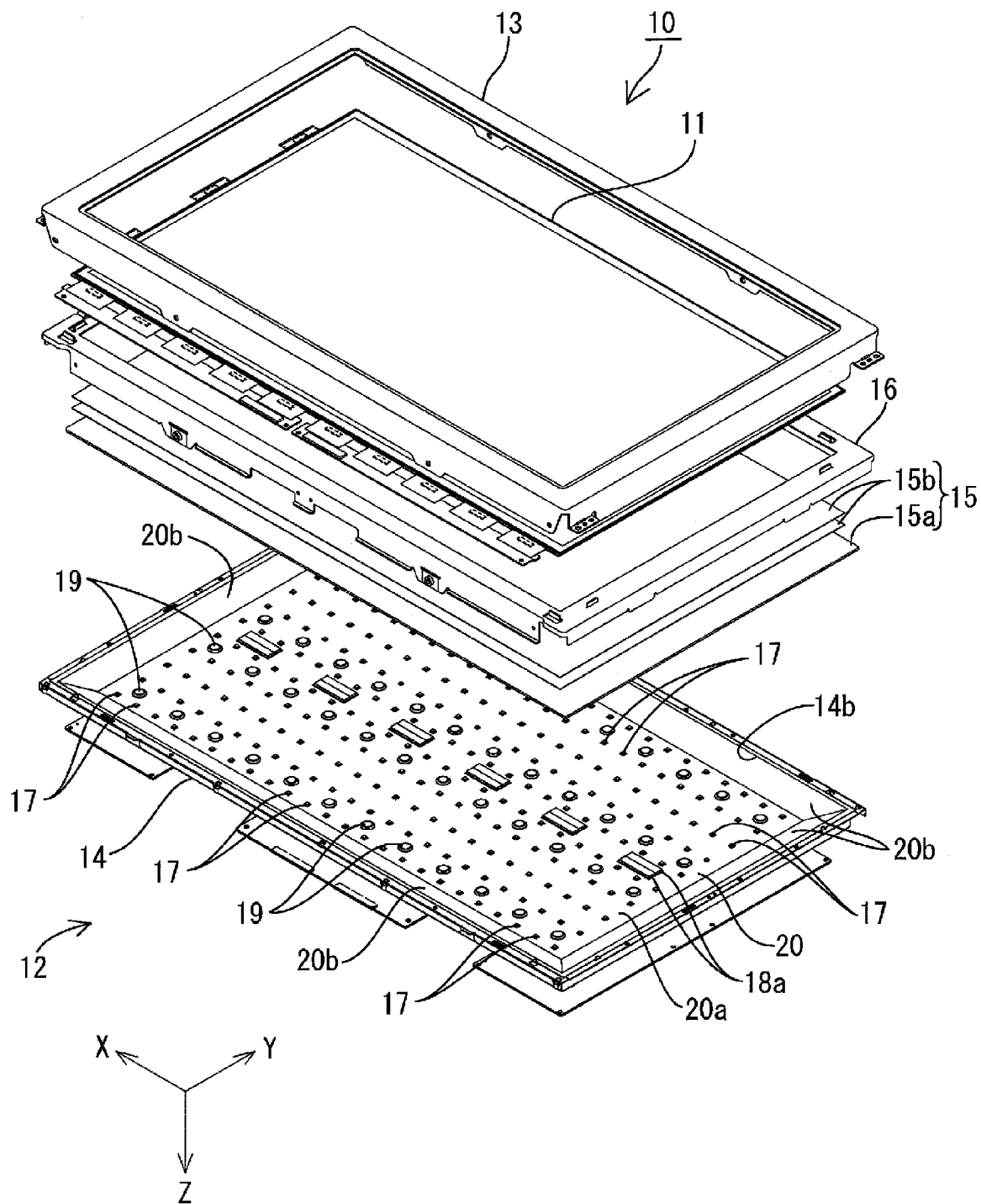
FIG. 2 is an exploded perspective view illustrating a general configuration of a liquid crystal display device included in the television device.

Next, the backlight unit 12 is described in detail. As illustrated in FIG. 2, the backlight unit 12 includes a chassis 14, an optical member 15, and a frame 16. The chassis 14 has a box-like shape having an opening 14b on a light exit side (on the liquid crystal panel 11 side). The optical member 15 is arranged so as to cover the opening 14b of the chassis 14. The frame 16 is arranged along an outer peripheral portion of the chassis 14 such that an outer peripheral portion of the optical member 15 set is sandwiched between the frame 16 and the chassis 14. Further, the chassis 14 houses a plurality of LEDs 17 (Light Emitting Diode) as light sources, an LED board (a light source board) 18 on which the LEDs 17 are mounted, board support members 19 holding the LED board 18 on the chassis 14, and a reflection sheet 20 configured to reflect the light in the chassis 14 toward the optical member 15. The backlight unit 12 according to this embodiment is a direct-type backlight unit in which the LEDs 17 as the light sources are arranged to face a rear surface of the liquid crystal panel 11. A light exit side of the backlight unit 12 is a side closer to the optical member 15 than the LEDs 17. On a rear side (the side opposite to the light exit side) of the chassis 14, which is outside of the chassis 14, an LED drive board 21 for turning on the LED 17 is provided. The LED drive board (a light source drive board) 21 and the LED board 18 are electrically connected through a flat cable (a flat conductor) 22. Hereinafter, components of the backlight unit 12 are described in detail.

The chassis 14 is made of metal such as aluminum. As illustrated in FIG. 3 to FIG. 6, the chassis 14 is made to have a substantially shallow box-like shape by a sheet metal forming process. The chassis 14 includes a bottom plate 14a, side plates 14c, and receiving plates 14d. The bottom plate 14a has a landscape quadrangular shape in a plan view (an elongated shape in which a long-side direction thereof matches the X-axis direction) similar to the liquid crystal panel 11. The side plates 14c rise from the respective outer edges of the bottom plate 14a toward the front side (the light exit side). The receiving plate 14d protrudes outwardly from upper edges of the side plates 14c. The bottom plate 14a has a surface extending parallel with the display surface of the liquid crystal display device 10. The long-side direction of the bottom plate 14a matches the X-axis direction (the horizontal direction) and a short-side direction thereof matches the Y-axis direction (the vertical direction). The bottom plate 14a includes a plurality of holes 14e through each of which a flat cable 22 is passed, at predetermined positions (FIG. 6), as will be described in detail later. The bottom plate 14a of the chassis 14 further includes attachment holes through which the board support members 19 are attached to the bottom plate 14a at predetermined positions. On a front surface of the receiving plates 14d of the chassis 14, the frame 16 and the optical member 15, will be described later, can be placed (FIG. 4 and FIG. 5). The frame 16 is screwed to the receiving plates 14d.

As illustrated in FIG. 2, the optical member 15 has a landscape quadrangular shape (a rectangular shape) in a plan view similar to the liquid crystal panel 11 and the chassis 14. As illustrated in FIG. 4 and FIG. 5, an outer peripheral portion of the optical member 15 is placed on the receiving plate 14d such that the optical member 15 covers the opening 14b of the chassis 14, and thus the optical member 15 is arranged between the crystal liquid panel 11 and the LEDs 17. The optical member 15 includes a diffuser plate 15a and optical sheets 15b. The diffuser plate 15a is arranged on a rear side (the LED 17 side, the side opposite to the light exit side) of the optical sheets 15b arranged on the front side (the liquid crystal panel 11 side, the light exit side). The diffuser plate 15a includes a substantially transparent resin base member having a predetermined thickness and diffuser particles dispersed in the base member. The diffuser plate 15a is configured to diffuse light passing therethrough. Each optical sheet 15b has a sheet-like shape having a thickness smaller than that of the diffuser plate 15a. Two optical sheets 15b are laminated on each other (FIG. 2). Specific examples of the optical sheet 15b include a diffuser sheet, a lens sheet, and a reflection-type polarizing sheet, and any one of them may be appropriately selected and used.

As illustrated in FIG. 2, the frame 16 has a frame shape extending along an outer peripheral portion of the liquid crystal panel 11 and the optical member 15. The outer peripheral portion of the optical member 15 is sandwiched between the frame 16 and the receiving plates 14d (FIG. 4 and FIG. 5). The frame 16 can receive a rear surface of an outer peripheral portion of the liquid crystal panel 11. The outer peripheral portion of the liquid crystal panel 11 can be sandwiched between the frame 16 and the bezel 13 that is arranged on the front side (FIG. 4 and FIG. 5).

As illustrated in FIG. 4, the LED 17 is configured by sealing a LED chip on a base member fixed to the LED board 18, with a resin material. The LED chip mounted on the base member has one main light emission wavelength and specifically, the LED chip that emits a single color of blue is used. A fluorescent material is dispersed in the resin material that seals the LED chip to emit a specific color, a white color as a whole, by being excited by blue light emitted by the LED chip. Examples of fluorescent material include a yellow fluorescent material that emits yellow light, a green fluorescent material that emits green light, and a red fluorescent material that emits red light. Such fluorescent materials may be appropriately used in combination or alone. The LED 17 is a top-type LED that has a light emitting surface on a side opposite from the surface that is mounted to the LED board 18. Further, the LED 17 integrally includes a diffuser lens (which is not illustrated in detail) configured to diffuse light at a light The diffuser lens is. The directivity of the light emitted from the LED 17 can be reduced by the diffuser lens, and thus the uneven brightness of the light from the backlight unit 12 can be reduced.

Figure 3:
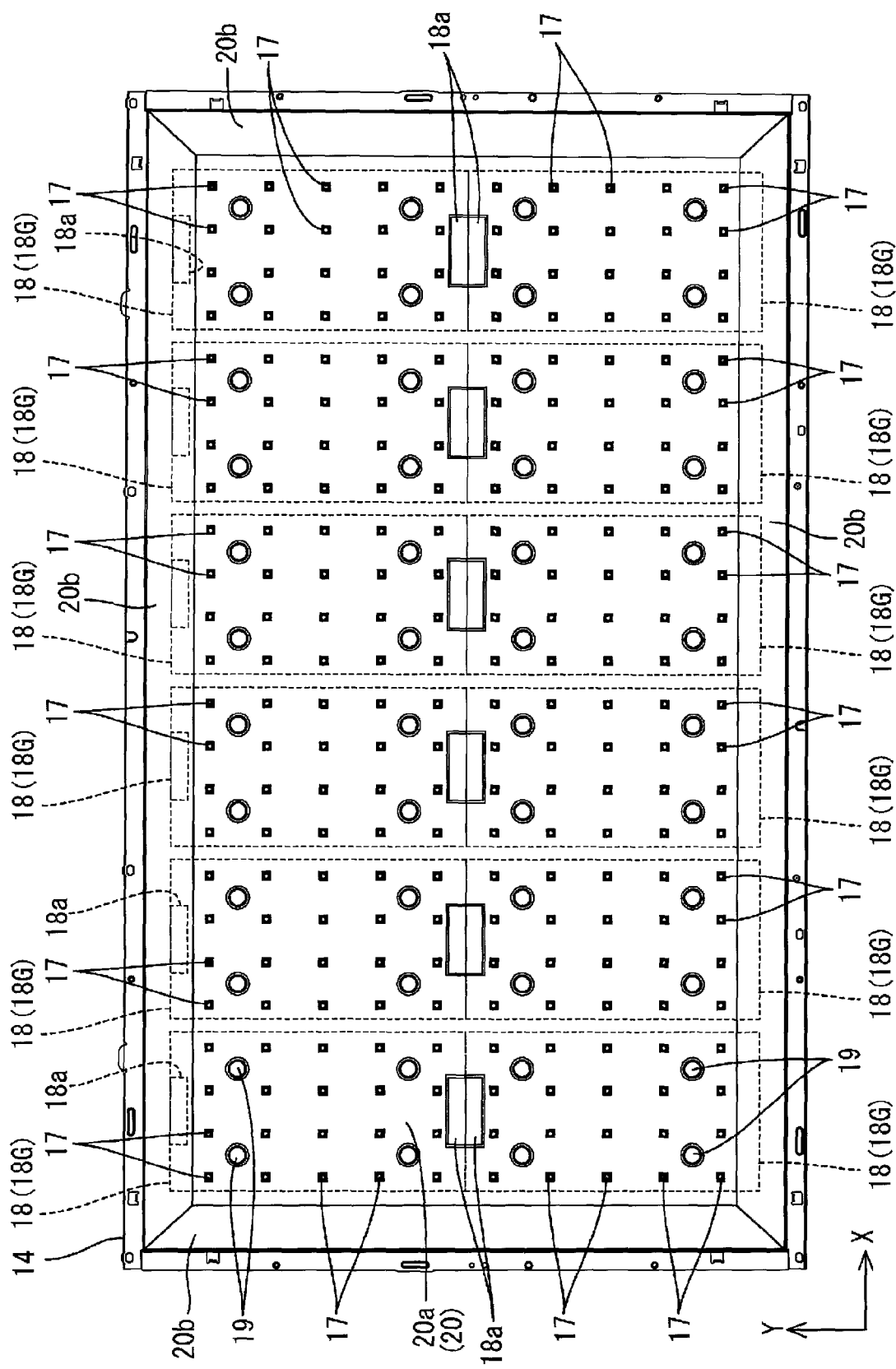
FIG. 3 is a plan view illustrating an arrangement of LEDs, an LED board, a reflection sheet, and a board support member in a chassis included in the liquid crystal display device.
Figure 7:
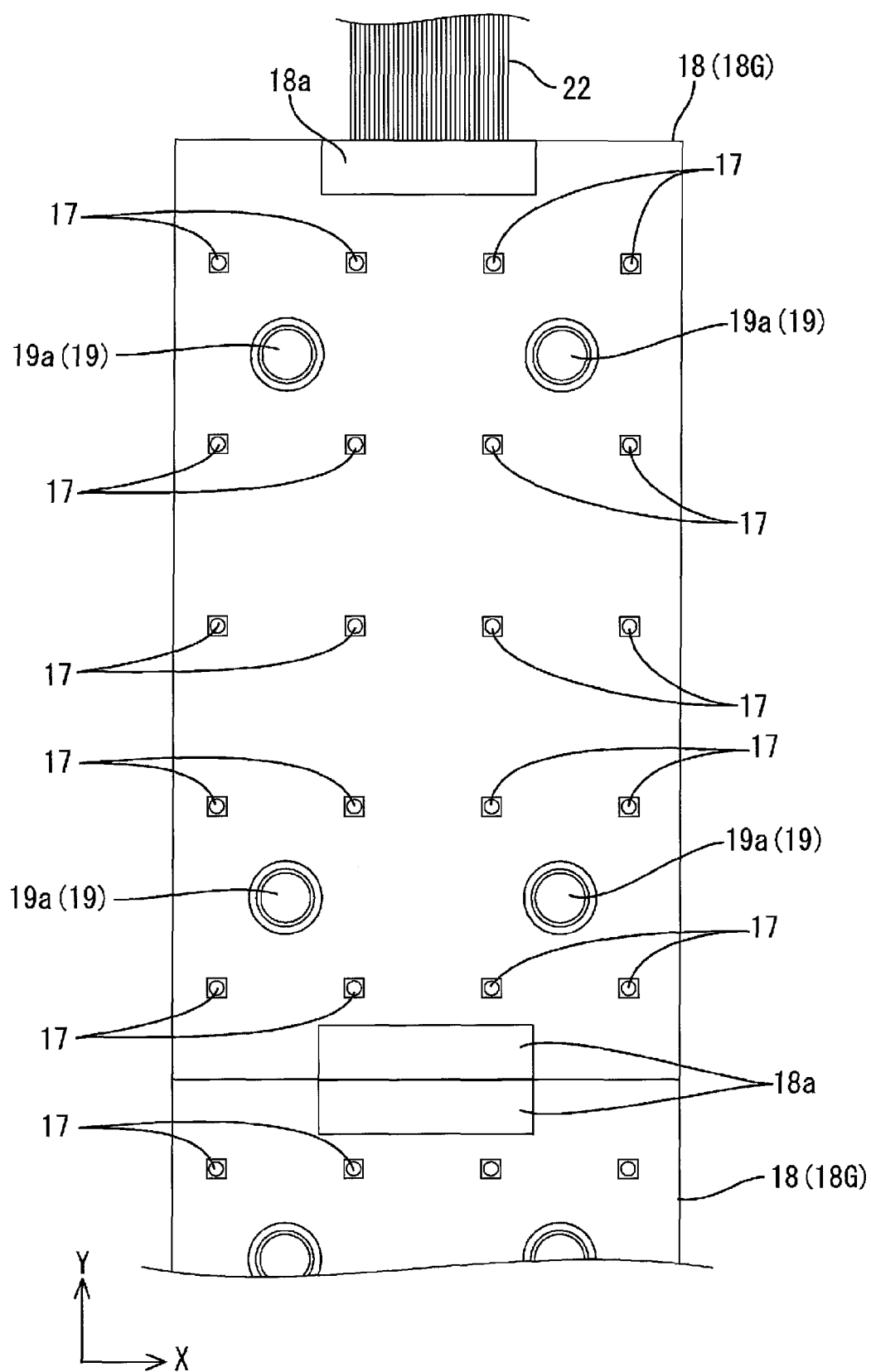
FIG. 7 is a magnified plan view of the LED board to which a flat cable is connected.

As illustrated in FIG. 3, the LED board 18 includes a base board having a portrait quadrangular shape in a plan view. The LED board 18 is housed in the chassis 14 along the bottom plate 14a such that a longitudinal direction (the long-side direction) of the LED board 18 matches the Y-axis direction, i.e., the short-side direction of the chassis 14, and a width direction (the short-side direction) thereof matches the X-axis direction, i.e., the long-side direction of the chassis 14. On a front surface of the base board of the LED board 18 (a surface facing the optical member 15), the LEDs 17 having the above-described configuration are mounted. As illustrated in FIG. 7, the LEDs 17 are arranged in a matrix (in rows and columns) along the longitudinal direction (the Y-axis direction) and the width direction (the X-axis direction) of the LED board 18. The LEDs 17 are each connected to a wiring pattern (not illustrated) provided on the LED board 18. Specifically, a total of twenty LEDs 17 are arranged, five LEDs 17 in the longitudinal direction and four LEDs 17 in the width direction of the LED board 18. The LEDs 17 are arranged at substantially regular intervals in each of the X-axis direction and the Y-axis direction. The wiring pattern includes a plurality of wiring portions connected to the LEDs 17. Each of the wiring portions that are electrically independent from each other may be connected to each of the LEDs 17. Namely, "individual-type connection" may be employed. Other than this type, some of the LEDs 17 may be grouped together as one group of LEDs 17 such that every one of the LEDs 17 is grouped into groups of LEDs 17. Then, the LEDs 17 included in each group of LEDs 17 may be connected in series by the wiring portions electrically independent from each other. Namely, "group-type connection" may be employed.

As illustrated in FIG. 3, two LED boards 18 each having the above configuration are arranged in the chassis 14 along the Y-axis direction (the vertical direction). Two LED boards 18 (a first light source board and a second light source board) constitute one LED board group 18G. On each of the LED boards 18 included in the LED board group 18G, a connector 18a is provided at at least on end portion in the longitudinal direction thereof. Specifically, the connector 18a is provided at each longitudinal end portion of the LED board 18 arranged on the upper side in the vertical direction, and the connector 18a is provided only at one longitudinal end portion of the LED board 18 arranged on the lower side in the vertical direction. More specifically, the connector 18a is provided only at an upper end portion of the LED board 18 on the lower side. The connectors 18a adjacent to each other are connected, and thus wiring patterns of two LED boards 18 (the first light source board and the second light board) included in one LED board group 18G are electrically connected to each other. Six LED board groups 18G are arranged in the chassis 14 along the X-axis direction with predetermined distances therebetween. The distances between the adjacent LED board groups 18G are substantially the same. The LED boards 18 are arranged as above, and thus the LEDs 17 are arranged in a matrix (in rows and columns) in the X-axis direction and the Y-axis direction. Each connector 18a includes an input terminal and an output terminal to which a wiring portion included in the wiring pattern is connected. This enables the flat cable 22 connected to only one end of the LED board group 28G to supply driving power. Further, the LED board 18 includes support member insertion holes through which the board support members 19 are inserted, at predetermined positions.

The board support member 19 is made of synthetic resin such as polycarbonate and has a white surface that provides high light reflectivity. As illustrated in FIG. 3 to FIG. 5, the board support member 19 includes a main body 19a and a fixing portion 19b. The main body 19a extends along a surface of the LED board 18. The fixing portion 19b extends from the main body 19a to the rear side, i.e., to the chassis 14 side. The fixing portion 19b is fixed to the chassis 14. The main body 19a has a substantially circular plate shape in a plan view. The LED board 18 and the reflection sheet 20 which will be described later can be sandwiched between the main body 19a of the board support member 19 and the bottom plate 14a of the chassis 14. The fixing portion 19b is passed through the support member insertion hole in the LED board 18 and the attachment holes in the bottom plate 14a of the chassis 14 at positions corresponding to the attachment positions of the board support members 19, and fixed to the bottom plate 14a. As illustrated in FIG. 3, a plurality of (specifically, four) board support members 19 are arranged on each of the LED boards 18. Specifically, each of the board support members 19 is arranged between the LEDs 17 adjacent to each other in the X-axis direction and the Y-axis direction.

The reflection sheet 20 is made of synthetic resin and has a white surface that provides high light reflectivity. As illustrated in FIG. 3 to FIG. 5, the reflection sheet 20 has a size enough to cover substantially entire inner surface of the chassis 14, and thus the reflection sheet 20 can collectively cover all of the LED boards 18 arranged in rows and columns in the chassis 14 from the front side. The reflection sheet 20 is configured to reflect the light in the chassis 14 toward the optical member 15. The reflection sheet 20 includes a bottom portion 20a, four rising portions 20b, and extended portions 20c. The bottom portion 20a extends along the bottom plate 14a of the chassis 14 and has a size enough to cover the most part of the bottom plate 14a. The rising portions 20b each rise from the respective outer edges of the bottom portion 20a toward the front side. The rising portions 20b are inclined with respect to the bottom portion 20a. The extended portions 20c extend outwardly from upper outer edges of the rising portions 20b and are placed on the receiving plates 14d of the chassis 14. The bottom portion 20a of the reflection sheet 20 is arranged on front surfaces of the LED boards 18, i.e., on surfaces on which the LEDs 17 are mounted. The bottom portion 20a of the reflection sheet 20 includes LED insertion holes at positions corresponding to the LEDs 17 in a plan view. Each of the LEDs 17 is passed through each of the LED insertion holes (see FIG. 3).

Figure 6:
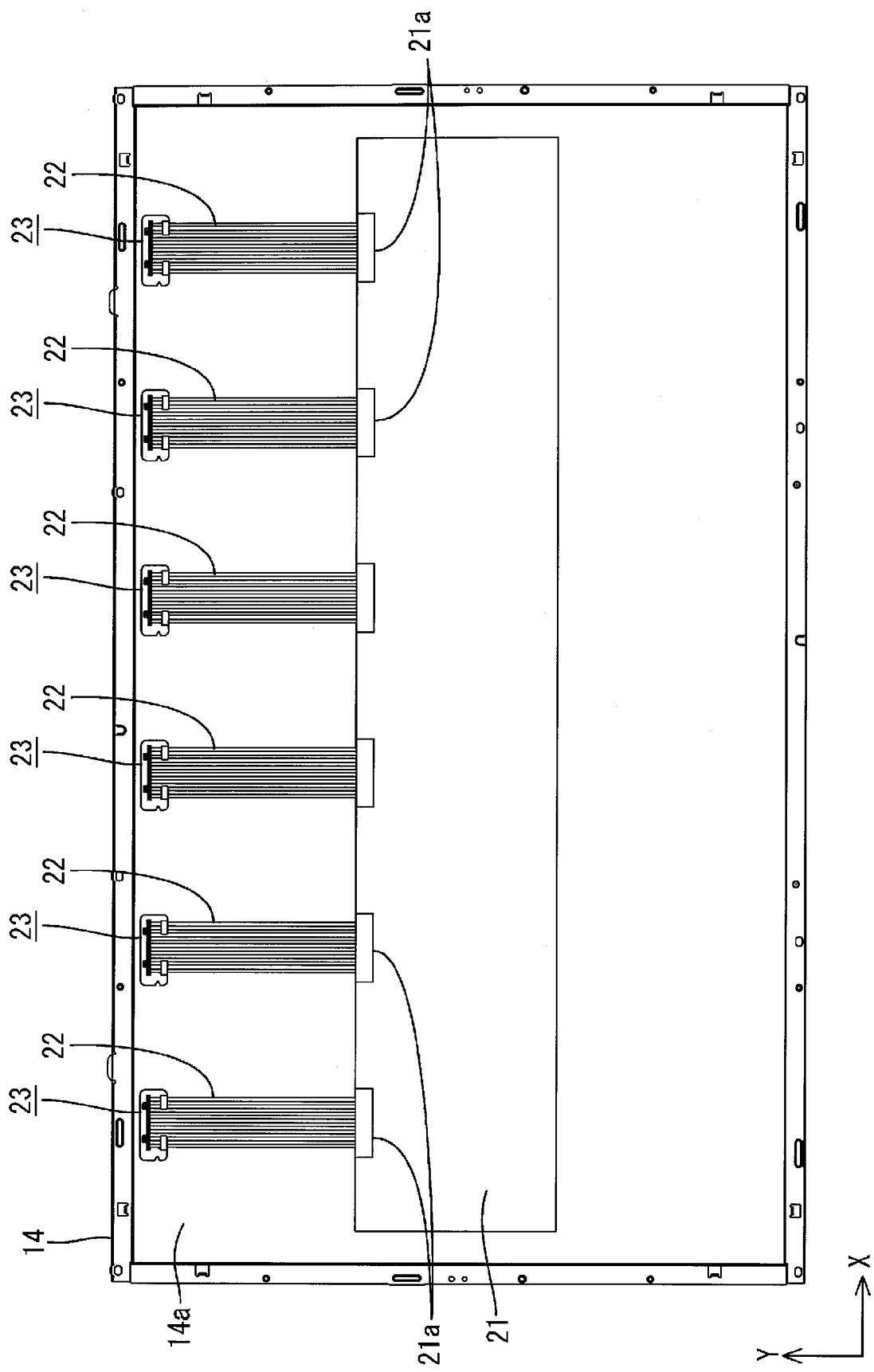
FIG. 6 is a bottom view illustrating an arrangement of a flat cable, a cable protector, an LED drive board in the chassis included in the liquid crystal display device.

As illustrated in FIG. 4 and FIG. 6, the LED drive board 21 has a landscape quadrangular shape in a plan view. The longitudinal direction (the long-side direction) of the LED drive board 21 matches the X-axis direction and the width direction (the short-side direction) thereof matches the Y-axis direction. The LED drive board 21 is arranged outside the chassis 14 to face the rear surface (a side opposite to the LEDs 17 side) of the bottom plate 14a. The LED drive board 21 is arranged at substantially middle of the bottom plate 14a in the short-side direction. The LED drive board 21 includes an LED controller and an LED driver. The LED controller and the LED driver are not illustrated. The LED controller outputs various control signals based on signals sent by a main board (a signal processing circuit) that processes signals relating to the image displayed on the liquid crystal panel 11. The LED driver is configured to turn on each LED 17 through a flat cable 22 based on various control signals sent by the LED controller. The flat cable 22 will be described later. The driving of the LED 18 can be properly controlled by the LED drive board 21 depending on images to be displayed on the liquid crystal panel 11. Specifically, to control the light emitted from each LED 17, the LED drive board 21 employs PWM (Pulse Width Modulation) in which each LED 17 is turned on and off periodically to change a ratio between the turn-on period and the turn-off period while the voltage values applied to the LEDs 17 are controlled to be the same. On the LED drive board 21, the connector 21a to which the flat cable 22 is connected is mounted. The number of the connectors 21a is the same as that of the LED board group 18G (six in this embodiment). The connectors 21a are arranged along the X-axis direction on an upper end portion of the LED drive board 21 in the vertical direction. Each of the flat cables 22 can be inserted into each of the connectors 21a.

Figure 8:
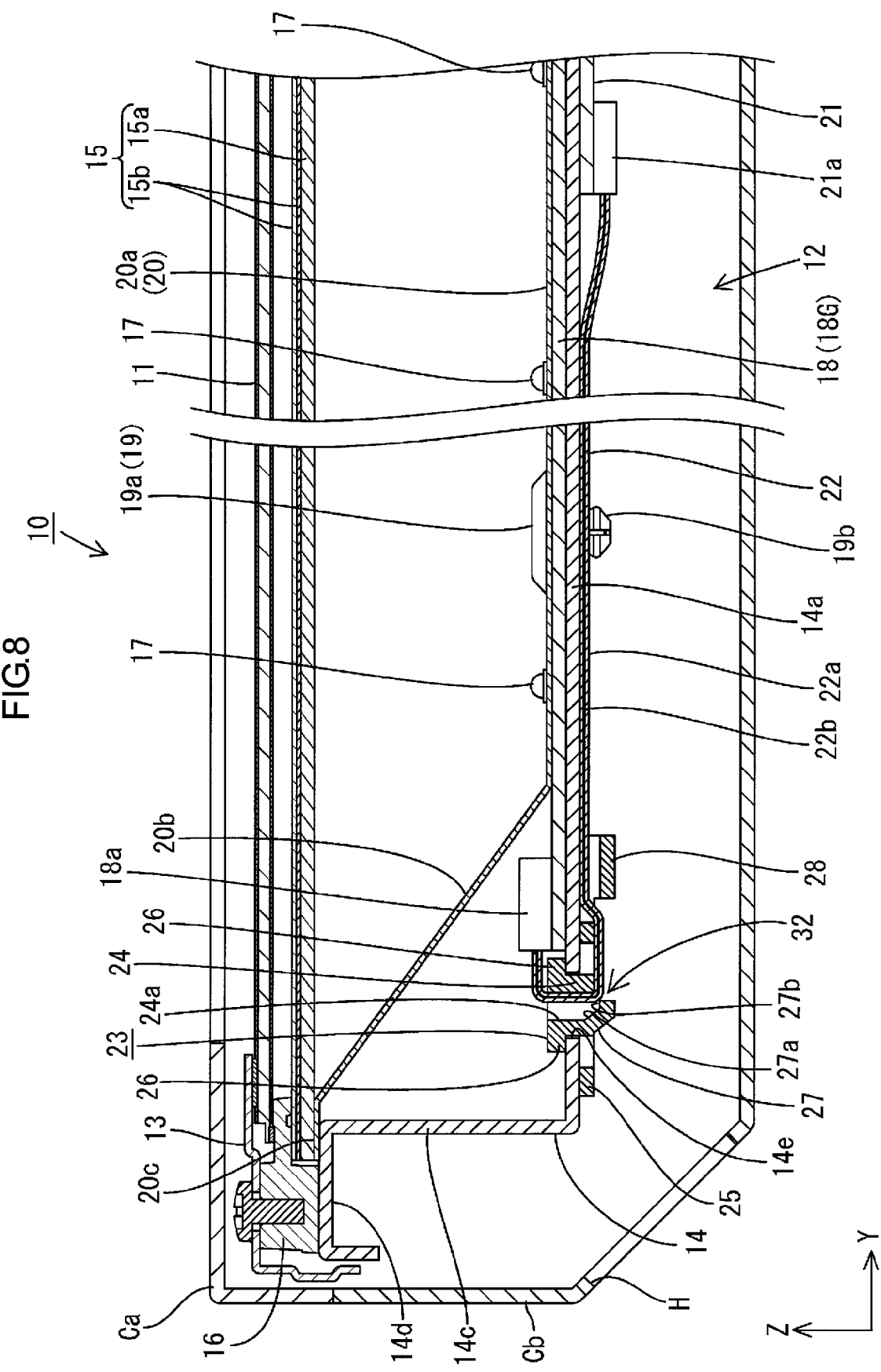
FIG. 8 is a cross-sectional view taken along the short-side direction of the liquid crystal display device, the flat cable and the cable protector being magnified.
Figure 9:
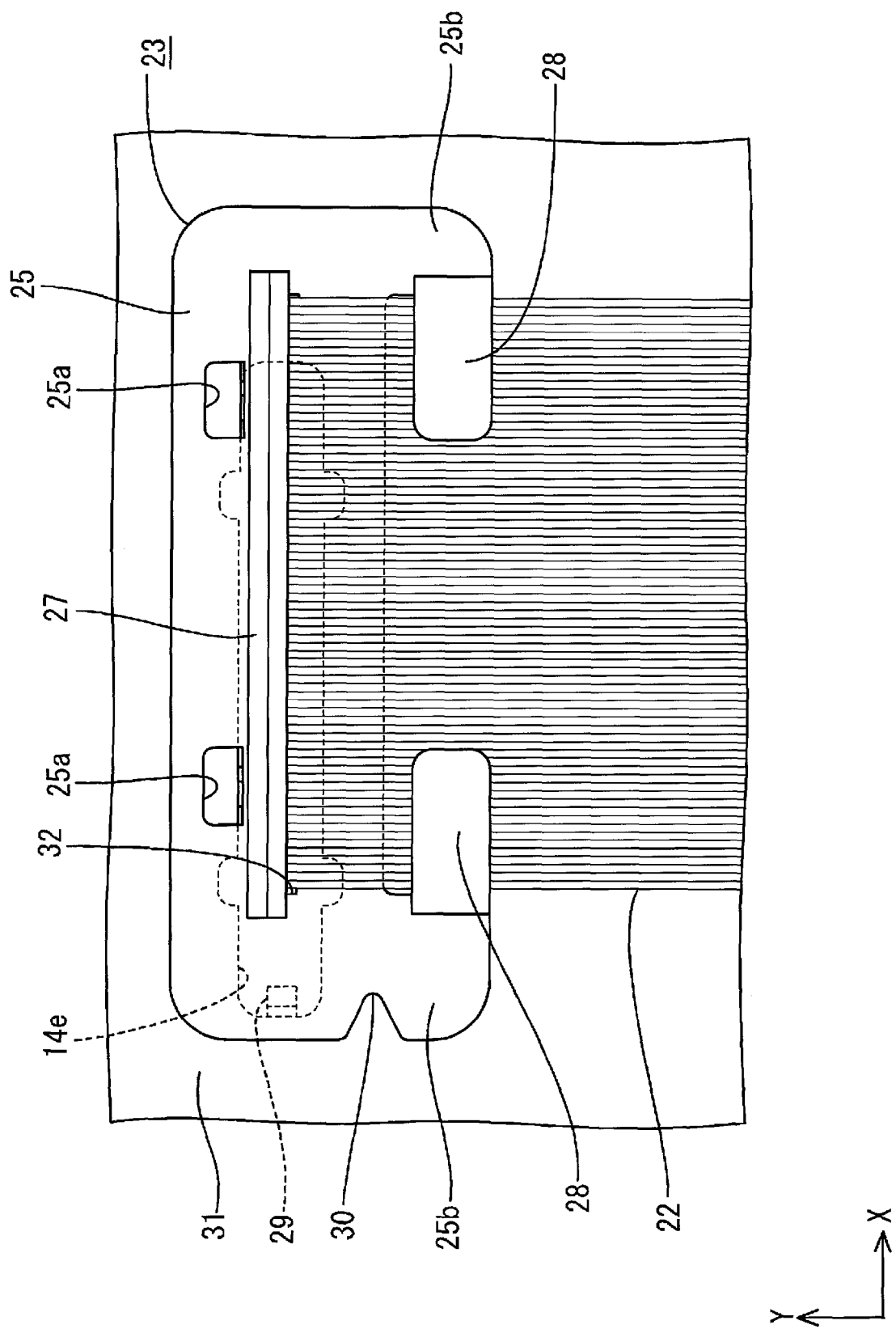
FIG. 9 is a magnified bottom view of the chassis illustrating the flat cable and the cable protector.

As illustrated in FIG. 4, FIG. 6, and FIG. 8, the flat cables 22 has a belt-like overall shape extending in one direction (specifically in the Y-axis direction). The flat cable 22 includes a main body 22a having sufficient flexibility and insulation properties and conducting bodies 22b having high conductivity. The conducting bodies 22b are provided in the main body 22a. The conducting bodies 22b are each made of metal and have a flat linear shape extending along an extending direction of the flat cable 22. The conducting bodies 22b are arranged in parallel with each other in a direction perpendicular to the extending direction of the flat cable 22 (the X-axis direction) at predetermined intervals. The main body 22a is made of synthetic resin and arranged to separate and surround each of the conducting bodies 22b in an insulated condition. The main body 22a has an outer shape corresponding to each conducting bodies 22b, and thus the surface is striped in a plan view (FIG. 6 and FIG. 9). One end of the flat cable 22 is arranged in the chassis 14 and inserted into the upper connector 18a on the LED board 18 arranged on the upper side in the vertical direction. The other end of the flat cable 22 is arranged outside the chassis 14 and is inserted into the connector 21a on the LED drive board 21. Accordingly, the flat cable 22 electrically connects the LED board 18 and the LED drive board 21. As the flat cable 22, FFC (Flexible Flat Cable) may be used, for example.

When the flat cable 22 having the above configuration is connected to the connectors 18a, 21a of the LED board 18 and the LED drive board 21, the conducting bodies 22b of the flat cable 22 are connected to the wiring pattern of each of the LED boards 18 included in the LED board group 18G, more specifically, to each wiring portion included in each wiring pattern. Accordingly, driving power from the LED drive board 21 can be supplied to each LED 17 through the wiring portion of the flat cable 22 and the wiring pattern of the LED board 18, and thus each LED 17 can be turned on depending on the connection type of the wiring pattern. Specifically, if the above-described individual-type connection is employed to connect the wiring pattern and the LEDs 17, the driving power can be supplied to each of the LEDs 17 that are individually connected to each of the wiring portions included in the wiring pattern. Accordingly, the voltage value and the PWM modulated value can be adjusted for each LED 17, and thus the brightness and the like can be individually controlled for each LED 17. If the above-described group-type connection is employed to connect the wiring pattern and the LEDs 17, the driving power can be supplied to each group of LEDs 17 connected in series by each wiring portion included in the wiring pattern. Accordingly, the voltage value and the PWM modulated value can be adjusted for each group of LEDs 17, and thus the brightness and the like can be adjusted for each group of LEDs 17. As described above, the flexible flat cable 22 including the conducting bodies 22b is used to connect the LED board 18 and the LED drive board 21, and thus freedom in a supply route of the driving power to each LED 17 increases. Thus, the brightness and the like of each LED 17 can be more precisely controlled. With this configuration, the controlled amount of light can be supplied from the backlight unit 12 to each divided display area included in the display area. In other words, "local dimming" can be performed.

Since the flat cable 22 connects the LED board 18 arranged in the chassis 14 and the LED drive board 21 arranged outside the chassis 14, as described above, the chassis 14 includes the holes 14e through each of which the flat cable 22 passes in and out of the chassis 14. The holes 14e are arranged on an upper end portion in the vertical direction of the bottom plate 14a of the chassis 14 along the X-axis direction in the number corresponding to the LED board group 18G (six holes 14e in this embodiment). Each of the flat cables 22 can be passed through each of the holes 14e. If each flat cable 22 is passed directly through each hole 14e, the following problems may occur. The hole 14e is formed by punching apart of the chassis 14 made of metal plate, so that the hole 14e may have a sharp edge. The sharp edge of the hole 14e may be in direct contact with the flat cable 22, and the edge may damage a surface of the flat cable 22. This may cause disconnection in the conductor 22b of the flat cable 22, and thus the LED 17 corresponding to such a conductor 22b cannot be turned on. Thus, the display quality may be deteriorated. In addition, the light from the LED 17 may leak from the chassis 14 to the outside of the chassis 14 through the hole 14e. In addition, dusts outside the chassis 14 may enter the chassis 14 through the hole 14e. This also may deteriorate the display quality. To prevent such problems, an adhesion tape may be attached to the edge portion of the hole 14e in which the flat cable 22 is inserted to close the hole 14e, for example. However, this deteriorates disassembly workability in repairing or scraping the liquid crystal display device 10 or the backlight unit 12 and recycling efficiency of the same.

In this embodiment, a cable protector 23 including a protection portion 24 is attached to the chassis 14 such that the protection portion 24 passes through the hole 14e. The cable protector 23 is made of synthetic resin. As illustrated in FIG. 8, generally, the cable protector 23 includes the protection portion 24, a flange 25, a holding portion 26, and a guiding portion 27, and a pressing portion 28. The protection portion 24 is arranged to pass through the hole 14e. The protection portion 24 includes an insertion hole 24a through which the flat cable 22 is inserted. The flange 25 is arranged to face an edge portion of the hole 14e. The holding portion 26 holds the edge portion of the hole 14e between the holding portion 26 and the flange 25. The guiding portion 27 guides the flat cable 22 passing through the insertion hole 24a in a specific direction. The pressing portion 28 holds a portion of the flat cable 22 that is arranged outside the chassis 14 after being passed through the insertion hole 24. The flange 25 and the holding portion 26 provide an attachment structure of the cable protector 23 to the chassis 14. As illustrated in FIG. 6, the cable protector 23 is attached to the hole 14e of the chassis 14, and thus the arrangement of the cable protectors 23 is the same as that of the holes 14e.

Figure 10:
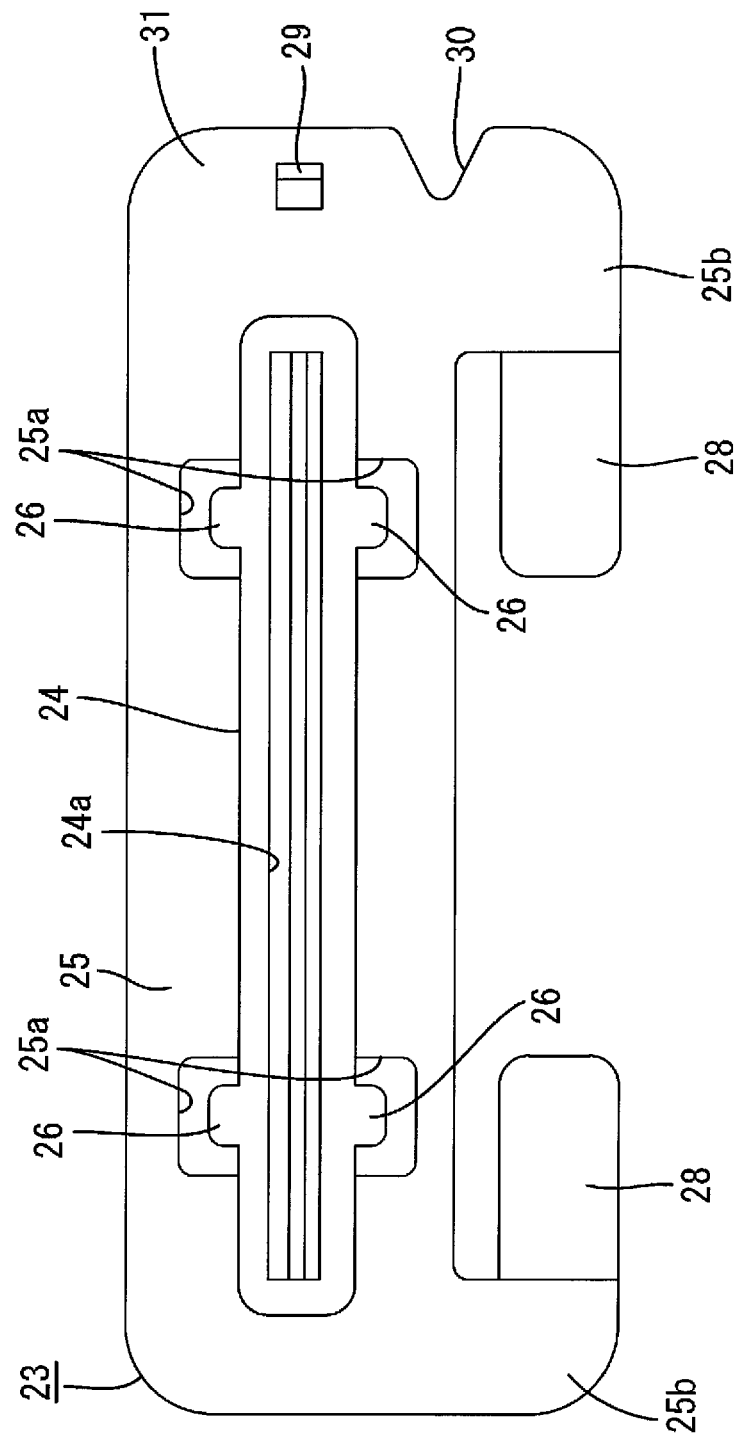
FIG. 10 is a plan view of the cable protector.
Figure 12:
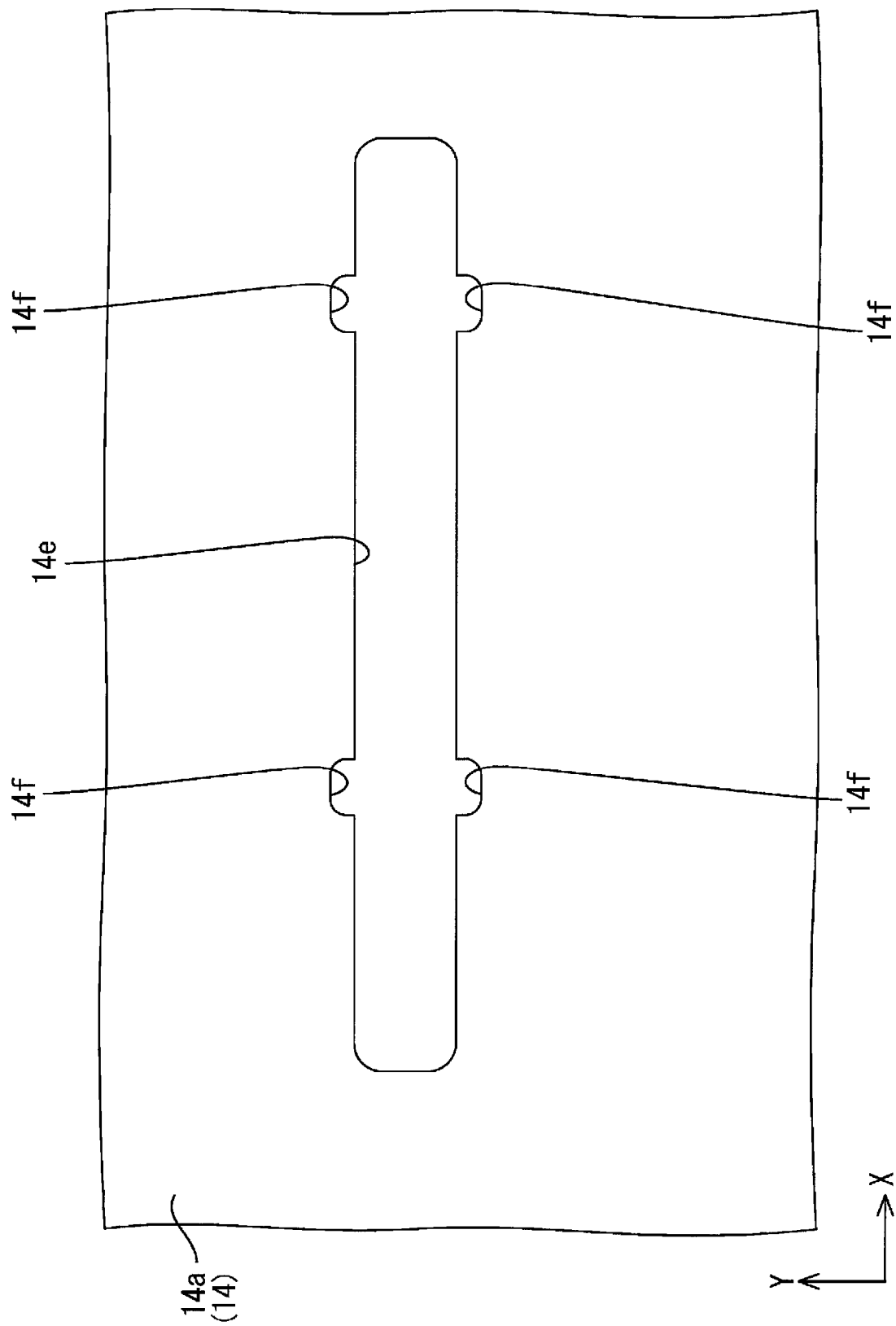
FIG. 12 is a magnified plan view of a hole in the chassis.

As illustrated in FIG. 8 and FIG. 10, the protection portion 24 has a landscape block-like shape in a plan view. The protection portion 24 has the insertion hole 24a extending through a middle portion thereof and has a substantially short square cylindrical shape. The insertion hole 24a has a landscape elongated shape corresponding to the outer shape of the protection portion 24 (the cross-sectional shape of the flat cable 22) in a plan view. The insertion hole 24a extends through the protection portion 24 substantially straight along the Z-axis direction. The protection portion 24 surrounds the part of the flat cable 22 that is positioned in the insertion hole 24a over the entire circumference thereof. The protection portion 24 is positioned between the flat cable 22 and the hole 14e, and thus the flat cable 22 cannot be in directly contact (abutting contact, slide-contact) with the edge portion of the hole 14e. Accordingly, the flat cable 22 can be protected. The protection portion 24 is arranged to pass through the hole 14e and attached to the chassis 14 such that the length (the long-side direction) of the protection portion 24 matches the X-axis direction and the width direction (the short-side direction) thereof matches the Y-axis direction. As illustrated in FIG. 12, the hole 14e in the chassis 14 through which the protection portion 24 passes has a substantially landscape quadrangular shape in a plane view so as to correspond to the outer shape of the protection portion 24. The hole 14e has a slightly larger width than the protection portion 24 and has a larger length than the protection portion 24 by a predetermined dimension (by a sliding amount of the cable protector 23 for attachment or detachment, which will be described later).

Here, the attachment structure (fixing structure) of the cable protector 23 with respect to the chassis 14 is described. To attach the cable protector 23 to the chassis 14, the protection portion 24 is inserted into the hole 14e and the cable protector 23 is linearly slid along the X-axis direction (the longitudinal direction of the protection portion 24) in a state that the holding portion 26 is arranged in the chassis 14 and the flange 25 is arranged outside the chassis 14 (a state illustrated in FIG. 13, FIG. 16, and FIG. 17). As a result, the edge portion of the hole 14e is held between the flange 25 and the holding portion 26, and thus the cable protector 23 is attached and fixed with respect to the chassis 14 (see FIG. 18 to FIG. 20). Subsequently, the flange 25 and the holding portion 26 constituting the attachment structure of the cable protector 23 will be described sequentially. Hereinafter, the sliding direction of the cable protector 23 for attachment (a direction indicated by an arrow in FIG. 16 and FIG. 17) is referred to as a front, the sliding direction of the cable protector 23 for detachment (a direction opposite to the direction indicated by the arrow in FIG. 16 and FIG. 17) is referred to as a rear.

Figure 11:
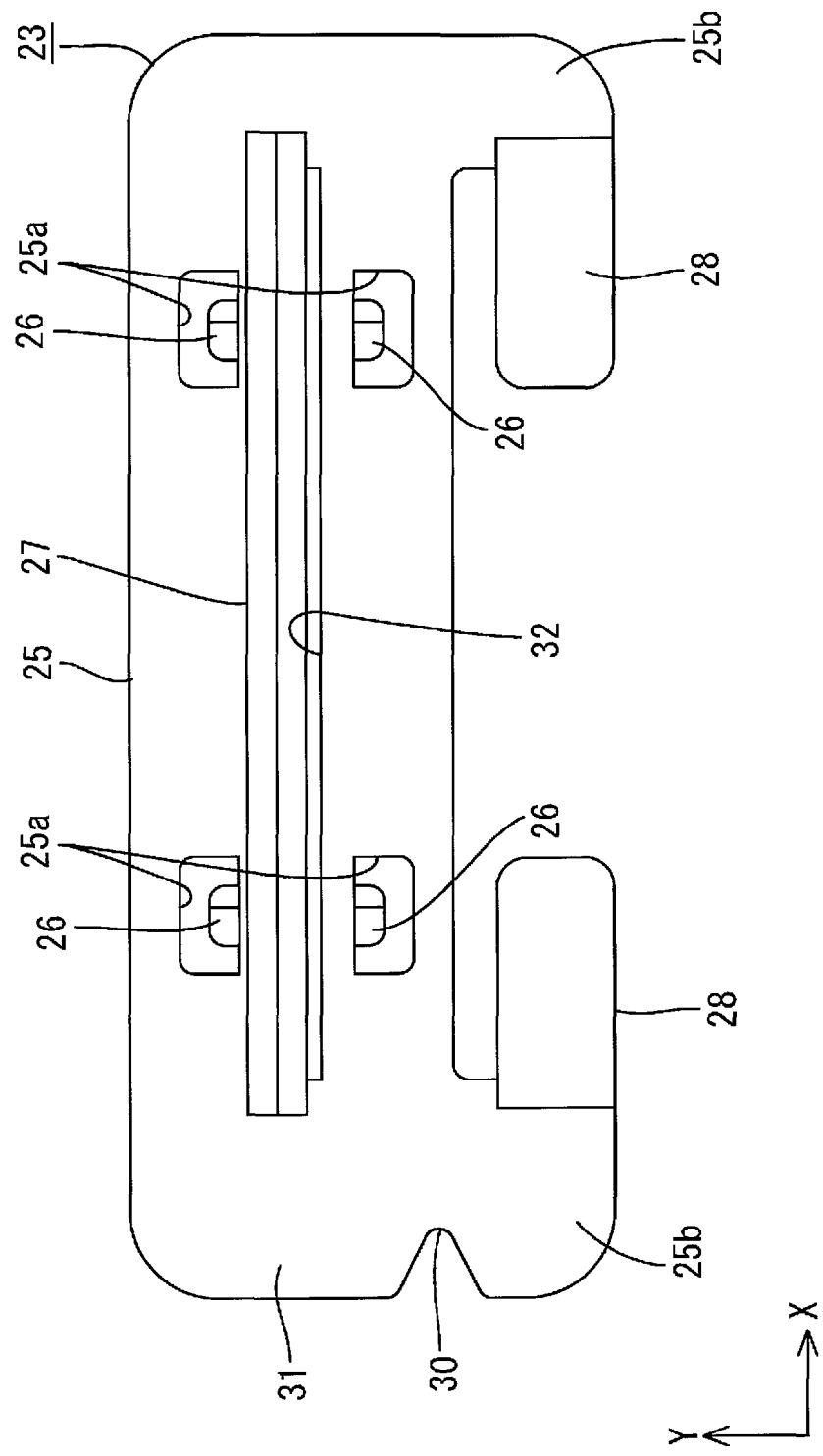
FIG. 11 is a bottom view of the cable protector.
Figure 18:
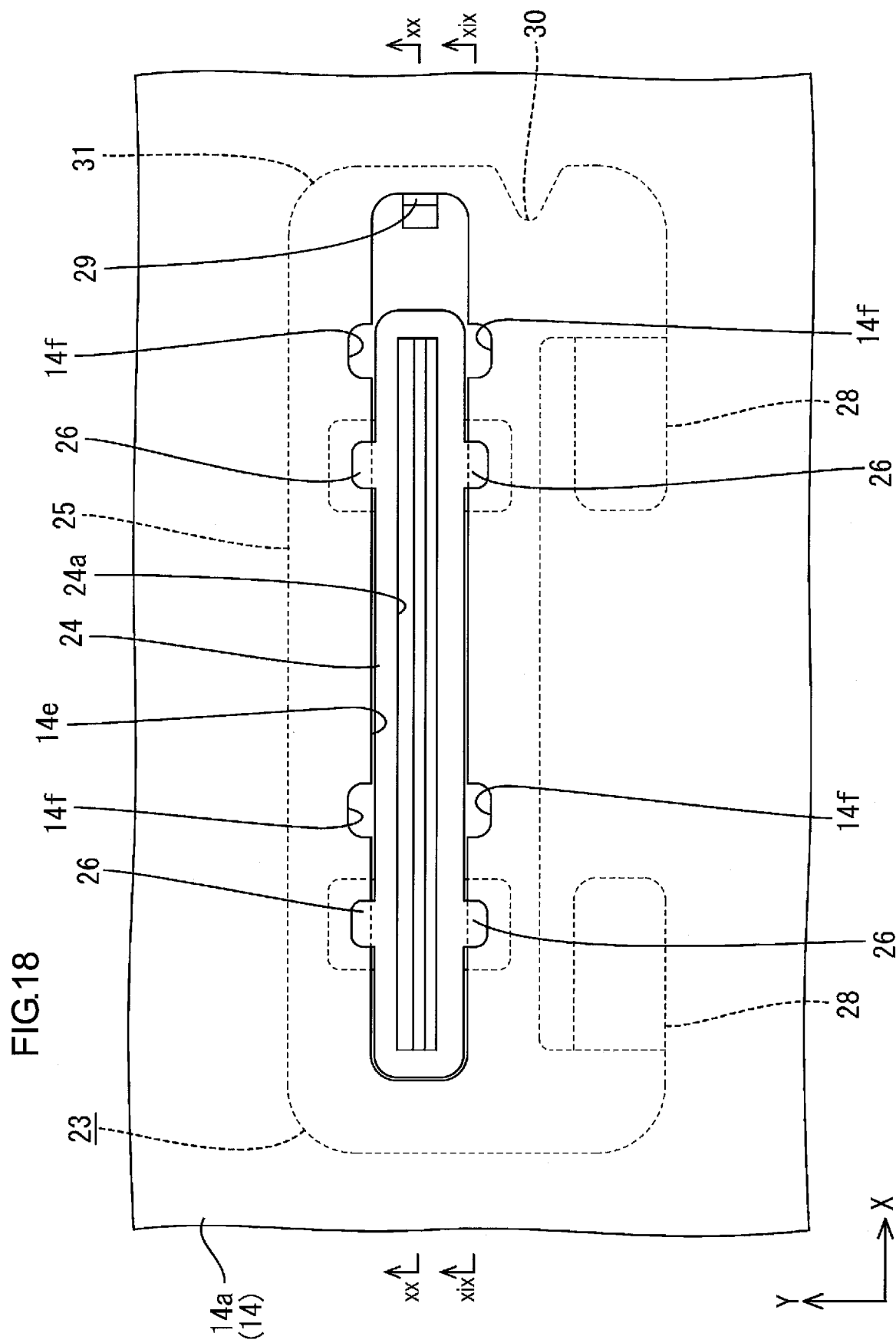
FIG. 18 is a plan view illustrating the cable protector at the holding position.
Figure 19:
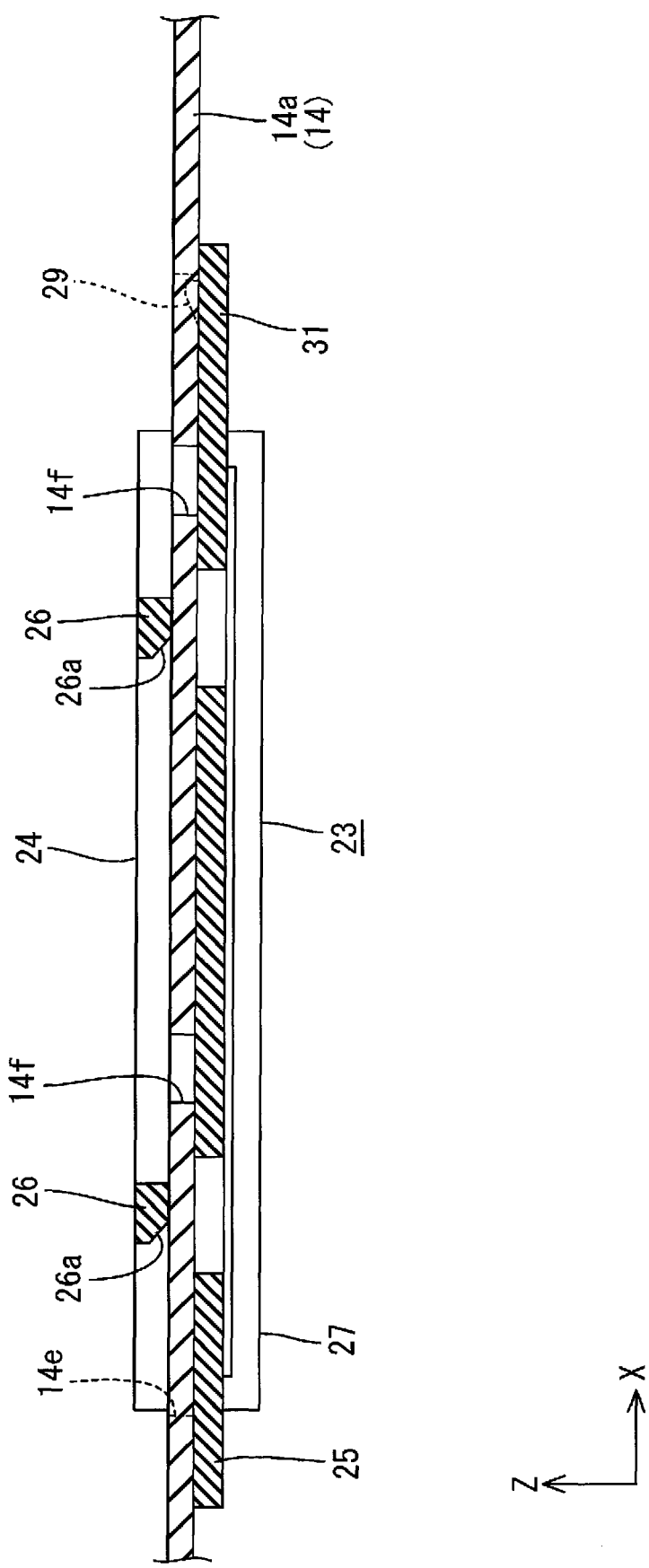
FIG. 19 is a cross-sectional view taken along a line xix-xix in FIG. 18.
Figure 20:
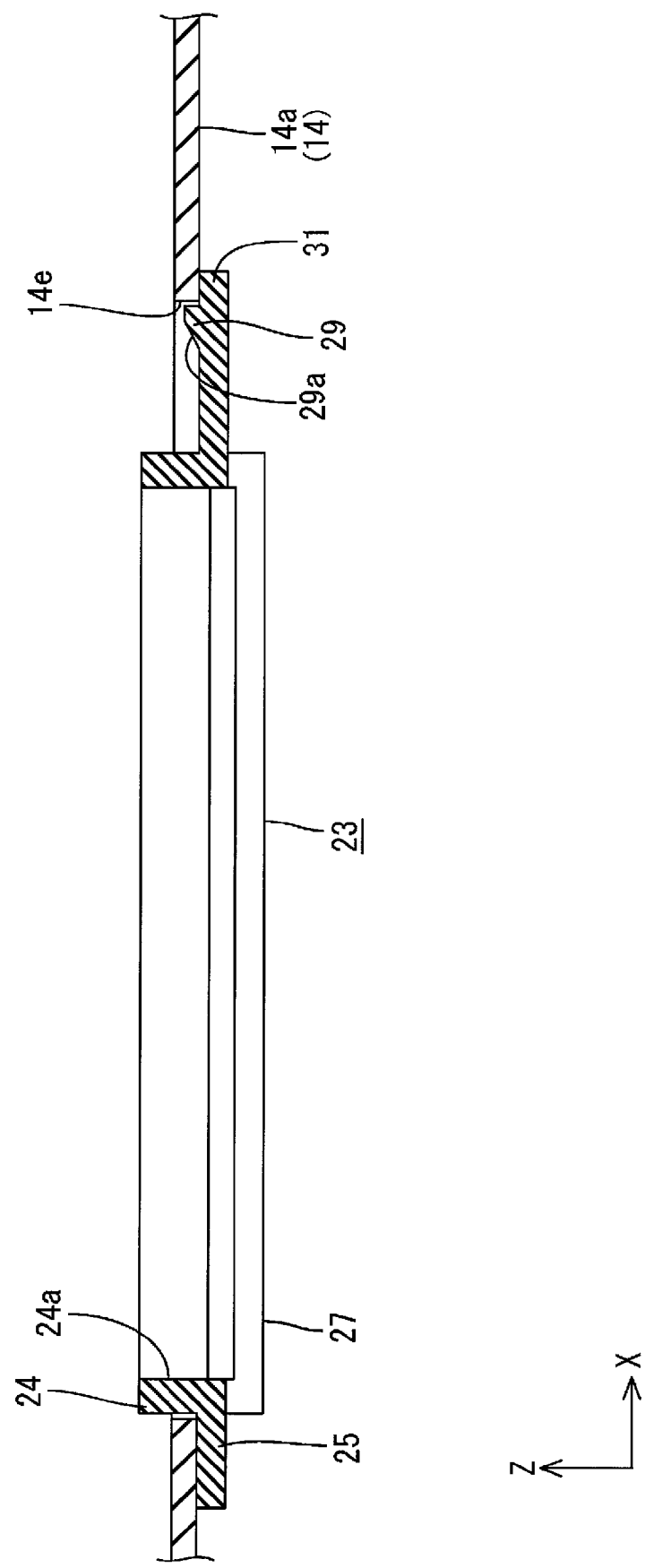
FIG. 20 is a cross-sectional view taken along a line xx-xx in FIG. 18.

As illustrated in FIG. 10 and FIG. 11, the flange 25 has a brim-like shape protruding outwardly from an outer surface of the protection portion 24. The flange 25 surrounds the protection portion 24 over the entire circumference thereof. In other words, the flange 25 is provided over the entire outer circumferential surface of the protection portion 24. The flange 25 has a substantially landscape quadrangular shape slightly larger than the protection portion 24 in a plan view. The flange 25 is arranged on the rear side of the chassis 14, which is outside of the chassis 14, and has a plate-like shape having a plate surface extending along the bottom plate 14a of the chassis 14. As illustrated in FIG. 8, FIG. 19, and FIG. 20, the flange 25 is arranged such that the plate surface thereof facing the front side faces and comes in contact with the rear surface of the bottom plate 14a, i.e., the outer surface of the bottom plate 14a. The flange 25 is arranged to be in contact with the edge portion of the hole 14e in the bottom plate 14a over the entire circumference of the hole 14e (FIG. 18). The flange 25 has a rear short-side portion (a portion in which a stopper and a cutout 30, which will be described later, are provided) that has a larger width than a front short-side portion. The flange 25 has an asymmetric shape as a whole.

As illustrated in FIG. 10 and FIG. 11, the holding portion 26 protrudes in the Y-axis direction (a direction perpendicular to the sliding direction of the cable protector 23) from an long-side outer surface of the protection portion 24 extending along the X-axis direction (a sliding direction of the cable protector 23). The holding portion 26 has a block-like shape. The holding portion 26 is arranged in pairs on each long-side outer surface of the protection portion 24 with a predetermined distance therebetween in the X-axis direction. That is, four holding portions 26 are arranged. Each holding portion 26 is arranged at a position closer to the edge than the center of the protection portion 24 in the X-axis direction. As illustrated in FIG. 8 and FIG. 19, the holding portion 26 is arranged on the outer surface of the protection portion 24 at a more front side in the Z-axis direction than the flange 25. A distance between the holding portion 26 and the flange 25 is substantially the same dimension as the thickness of the bottom plate 14a of the chassis 14. Specifically, the protection portion 26 is arranged at a front end of the holding portion 24 such that a front surface of the protection portion 26 is flush with a front surface of the protection portion 24. A rear surface of the holding portion 26 faces and is in contact with a front surface, i.e., the inner surface, of the edge portion of the hole 14e of the bottom plate 14a. The holding portion 26 has a tapered slide guiding surface 26 at a left end thereof in FIG. 19, i.e., at a front end thereof in the sliding direction for attachment. The slid guiding surface 26a enables the holding portion 26 to be smoothly slid for attachment without being caught on the edge portion of the hole 14e. The flange 25 includes die cutting holes 25a (FIG. 10 and FIG. 11), because the holding portions 26 are formed by die cutting at the time of formation of the cable protector 23 with resin.

Figure 13:
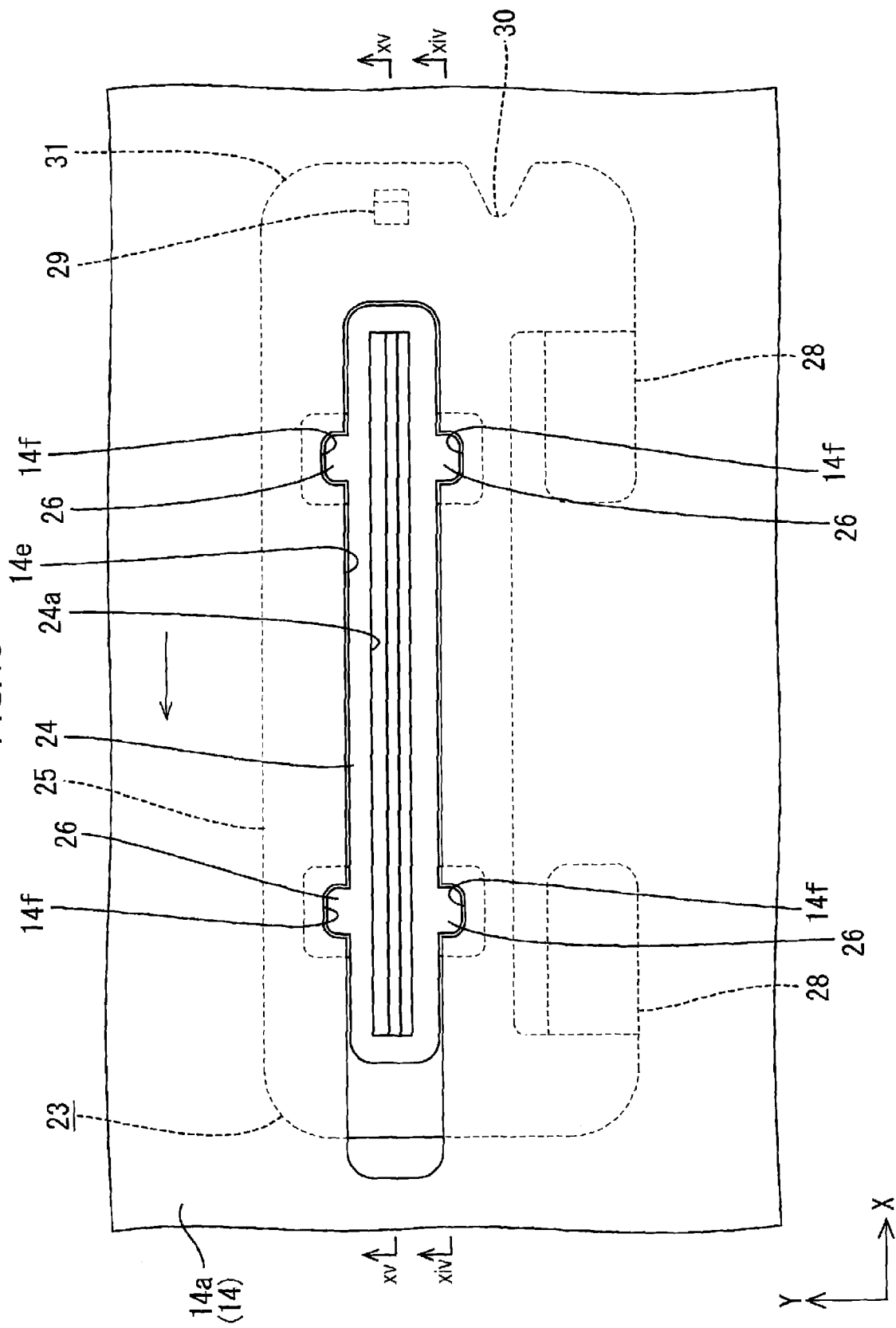
FIG. 13 is a plan view illustrating a positional relation between the cable protector and the hole in a state that holding portions are positioned in holding portion insertion holes.

As illustrated in FIG. 12, the bottom plate 14a of the chassis 14 includes holding portion insertion holes 14f through which the holding portions 26 are passed. The holding portion insertion holes 14f and the hole 14e communicate with each other (continuous openings). Two holding member insertion holes 14f are provided on each long-side edge portion of the hole 14e with a predetermined distance therebetween in the X-axis direction. The holding member insertion holes 14f are arranged at positions overlapping with the holding portions 26 in a plan view (FIG. 13). The cable protector 23 is selectively positioned at one of a non-holding position (FIG. 13, FIG. 16, and FIG. 17) and a holding position (FIG. 18 to FIG. 20). At the non-holding position, the holding portions 26 are positioned in the holding portion insertion holes 14f and are away from the edge portion of the holes 14e. At the holding position, the holding portions 26 are away from the holding portion insertion hole 14f and held against the edge portion of the hole 14e. The cable protection 23 can be slid between the non-holding position and the holding position along the X-axis direction. At the non-holding position, the holding portion 26 can be inserted into or removed from the corresponding holding portion insertion hole 14f. The cable protector 23 can be moved in a direction in which the cable protector 23 is detached from the bottom plate 14a of the chassis 14, i.e., in the Z-axis direction (a direction perpendicular to both of the sliding direction and the projecting direction of the holding portion 26). At the holding position, the edge portion of the hole 14e is held between the flange 25 and the holding portion 26. Accordingly, the cable protector 23 cannot be moved with respect to the bottom plate 14a of the chassis 14 in the Z-axis direction, and thus the cable protector 23 is fixed to the chassis 14.

Figure 16:
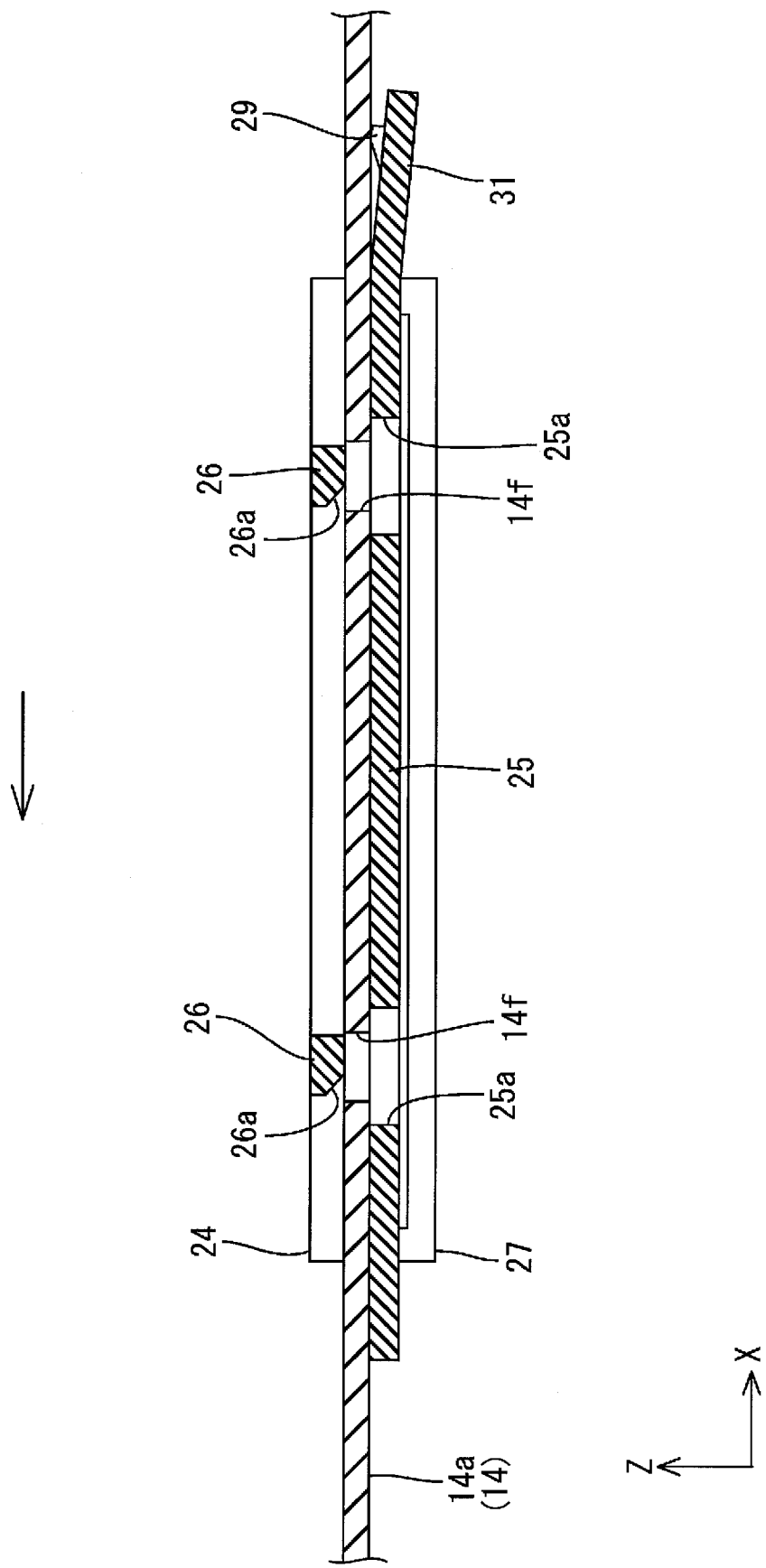
FIG. 16 is a cross-sectional view taken along a line xiv-xiv of FIG. 13, the view illustrating the cable protection portion attached to the chassis at the non-holding position.
Figure 17:
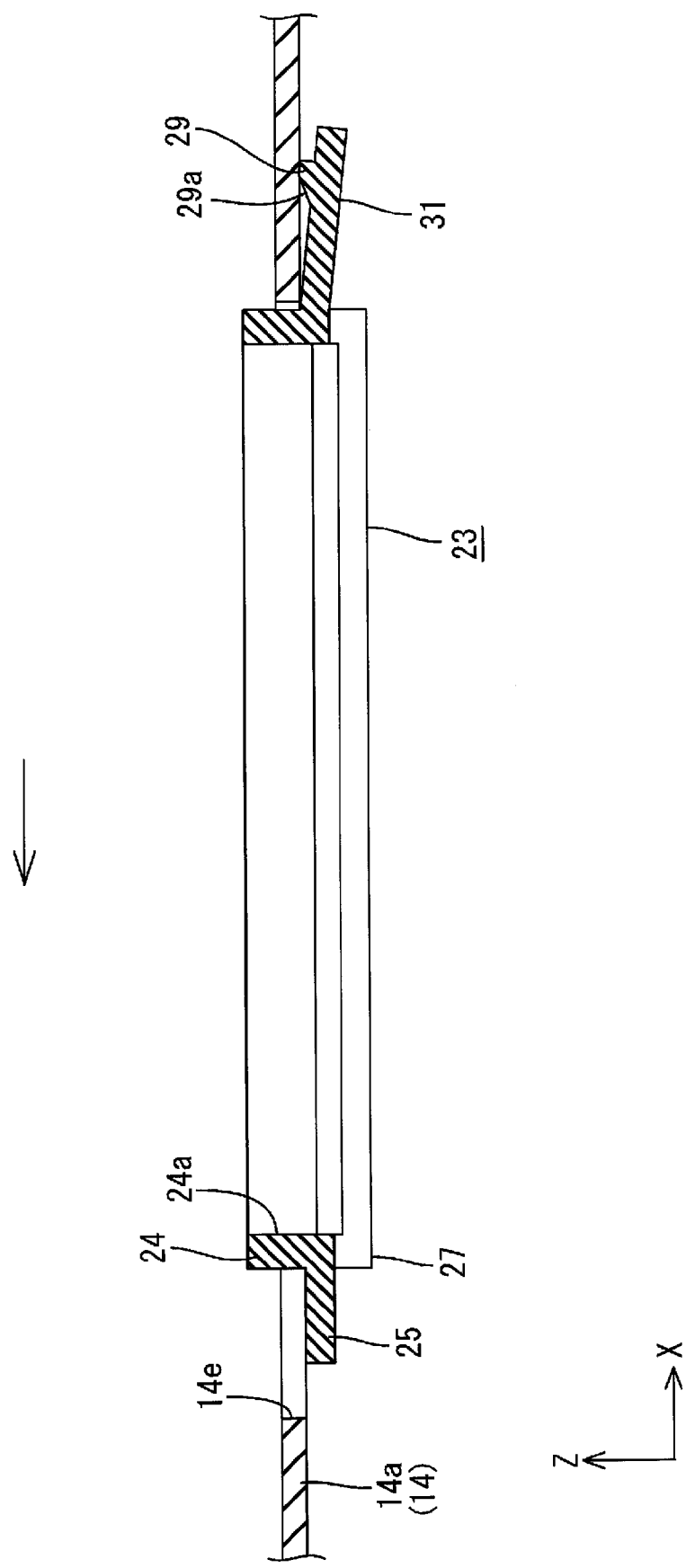
FIG. 17 is a cross-sectional view taken along a line xv-xv of FIG. 13, the view illustrating the cable protector attached to the chassis at the non-holding position.

As illustrated in FIG. 10 and FIG. 20, a stopper 29 is provided on the flange 25 described above. The stopper 29 is configured not to allow the cable protector 23 at the holding position to move toward the non-holding position, i.e., toward the rear side in the sliding direction of the cable protector 23 for attachment. The stopper 29 has a block-like shape protruding from the front surface of the flange 25 (the surface facing the bottom plate 14a) toward the front side. The stopper 29 is positioned on a rear short-side portion of the flange portion 25 on the right side in FIG. 10 and FIG. 20, i.e., on a short-side portion on the rear side in the sliding direction of the cable protector 23 for attachment. The stopper 29 is not positioned at the same position as the holding portions 26 in the Y-axis direction (the direction perpendicular to the sliding direction), but is positioned at the same position as the protection portion 24 in the Y-axis direction. Accordingly, the stopper 29 can enter the hole 14e of the chassis 14, but cannot enter the holding portion insertion hole 14f. Further, the stopper 29 is positioned rearward away from the hole 14e (FIG. 13, FIG. 16, and FIG. 17) when the cable protector 23 is positioned at the non-holding position. On the other hand, the stopper 19 is positioned in the hole 14e and held against a rear inner surface of the hole 14e when the cable protector 23 is positioned at the holding position, and thus the cable protector 23 does not come off through the hole 14e (FIG. 18 to FIG. 20). Additionally, a cutout 30 is provided at a rear short-side portion of the flange 25 to form a side portion 31 having a fixed end and a free end. The side portion 31 can be elastically deformed in the Z-axis direction from its base end portion adjacent to the protection portion 24. The stopper 29 is provided on the side portion 31, and thus when the cable connector 32 is positioned at the non-holding position, i.e., when the stopper 29 is away from the hole 14e and in contact with the bottom plate 14a, the side portion 31 is elastically deformed (FIG. 17).

Next, the guiding portion 27 is described. As illustrated in FIG. 8 and FIG. 9, the guiding portion 27 is integral with the protection portion 24 and overlaps with the insertion hole 24a in a plan view. Specifically, the guiding portion 27 protrudes diagonally from a surface of the protection portion 24 facing the rear side (the outside of the chassis 14) toward the rear side so as to overlap with the insertion hole 24a. The guiding portion 27 has an eaves-like shape. The guiding portion 27 provides an outlet 32 together with the edge portion of the insertion hole 24a. The flat cable 22 is drawn to the outside of the chassis 14 through the outlet 32. The outlet 32 opens diagonally toward the lower right. The guiding portion 27 is provided on the edge portion of the insertion hole 24a, such that the inner surface of the guiding portion 27 is continuous from the inner surface of the insertion hole 24a. Accordingly, when the flat cable 22 is passed through the insertion hole 24a, the flat cable 22 is drawn while being in contact with the inner surface of the guiding portion 27. Thus, the flat cable 22 is guided to the opening of the outlet 32. The inner surface of the guiding portion 27 includes an inclined surface 28a and a perpendicular surface 27b adjacent to each other. The inclined surface 28a inclines with respect to the inner surface of the insertion hole 24a. The perpendicular surface 27b is substantially perpendicular to the inner surface of the insertion hole 24a. The guiding portion 27 is provided on an upper long-side portion of the edge portions of the insertion hole 24a in the vertical direction, and thus the outlet 32 opens diagonally downward in the vertical direction. Accordingly, dusts outside the chassis 14 hardly enter the outlet 32.

Next, the pressing portion 28 is described. As illustrated in FIG. 9 and FIG. 10, two extended portions 25b extend from end portions in the long-side direction of the flange 25 downward in the vertical direction, i.e., a direction in which the flat cable 22 is drawn from the outlet 32. On each of the extended portions 25b, the pressing portion 28 is integrally provided to hold the flat cable 22 arranged outside the chassis 14 against the bottom plate 14a of the chassis 14. Two pressing portions 28 are provided to correspond to two extended portions 25b. The pressing portions 28 are each arranged at positions corresponding to each end portion of the flat cable 22 in the width direction (the X-axis direction). The pressing portions 28 each having the fixed end and the free end are each arranged so as to protrude inwardly from each of the extended portions 25 in the X-axis direction, i.e., such that a distance between the pressing portions 28 becomes smaller. Accordingly, the pressing portions 28 is arranged so as not to overlap with the flange 25 in a plan view. The pressing portions 28 face the bottom plate 14a of the chassis 14.

As illustrated in FIG. 8, the pressing portion 28 protrude from the extended portion 25b so as to be slightly away from the extended portion 25b to the rear side in the Z-axis direction, i.e., in a direction away from the bottom plate 14a. This provides a predetermined space between the pressing portion 28 and the bottom plate 14a. The space between the pressing portion 28 and the bottom plate 14a is larger than the thickness of the flat cable 22. An inner surface of the pressing portion 28 (a surface facing the bottom plate 14a) is arranged parallel with a plate surface of the bottom plate 14a. The inner surface of the pressing portion 28 is arranged father from the bottom plate 14a in the Z-axis direction than an outer surface of the flange 25 (the surface opposite to the surface facing the bottom plate 14a) is. The inner surface of the pressing portion 28 is substantially flashed with the perpendicular surface 27b included in the inner surface of the guiding portion 27. More specifically, a difference between a distance between the inner surface of the pressing portion 28 and the bottom plate 14a in the Z-axis direction and a distance between the outer surface of the flange 25 and the bottom plate 14a in the Z-axis direction is smaller than the thickness of the flat cable 22. Accordingly, the flat cable 22 drawn downwardly in the vertical direction from the outlet 32 extends along the outer surface of the flange 25 and is bent at the pressing portion 28 facing the bottom plate 14a so as to get closer to the bottom plate 14a. Then, the flat cable 22 extends along the bottom plate 14a. As described above, the pressing portions 28 press the flat cable 22 bent between the flange 25 and the pressing portions 28 at each end portion thereof in the width direction, and thus the flat cable 22 cannot move in the Z-axis direction so as to be away from the bottom plate 14a of the chassis 14. Accordingly, the flat cable 22 hardly loosens.

This embodiment have the above configuration, and the operation thereof will be described below. The liquid crystal panel 11 and the backlight unit 12 are separately produced and assembled together by the bezel 13 or the like to obtain the liquid crystal display device 10 illustrated in FIG. 4 and FIG. 5. The assembly operation of the backlight unit 12 is described in detail.

Figure 14:
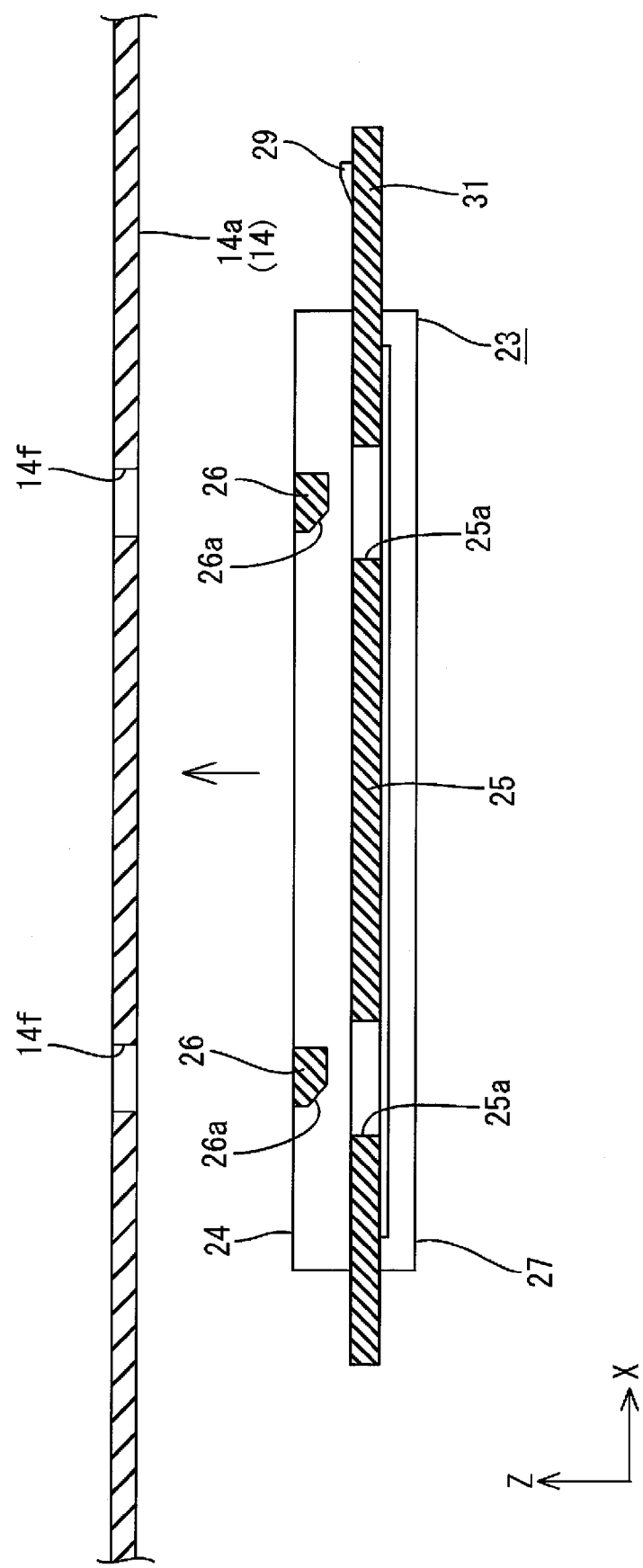
FIG. 14 is a cross-sectional view taken along a line xiv-xiv in FIG. 13, the view illustrating a state before the cable protector is attached to the chassis.
Figure 15:
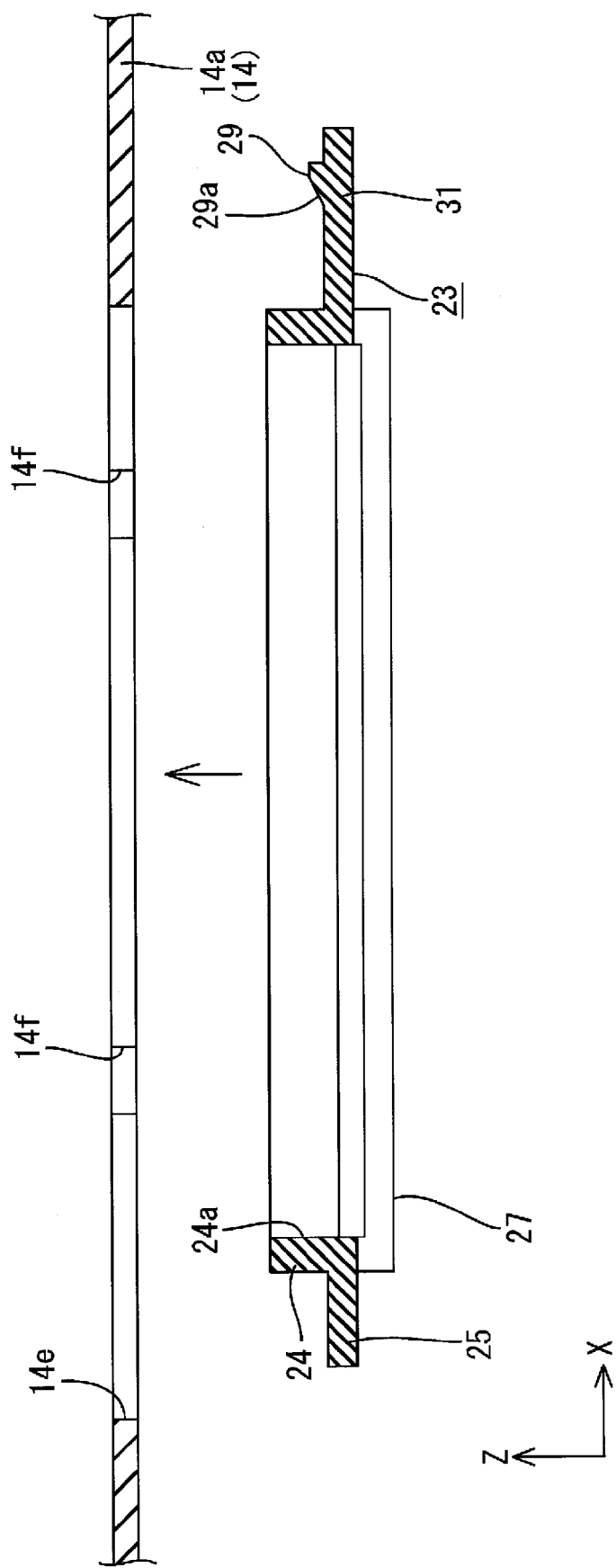
FIG. 15 is a cross-sectional view taken along a line xv-xv in FIG. 13, the view illustrating a state before the cable protector is attached to the chassis.

The cable protector 23 is attached to the chassis 14 while the LED board 18 on which the LEDs 17 are mounted is housed in the chassis 14. The attachment operation of the cable protector 23 is described in detail. As illustrated in FIG. 14 and FIG. 15, the cable protector 23 is located on the rear side of the bottom plate 14a of the chassis 14. Then, the protection portion 24 and the holding portions 26 included in the cable protector 23 are positioned so as to correspond to the positions of the hole 14e and the holding portion insertion holes 14f, respectively. Then, the cable protector 23 is moved to the bottom plate 14a and pushed such that the protection portion 24 and the holding portions 26 are passed through the hole 14e and the holding portion insertion holes 14f, respectively. In addition, the flange 25 comes in contact with the rear surface of the bottom plate 14a. Consequently, as illustrated in FIG. 13 and FIG. 16, the holding portions 26 are passed through the holding portion insertion holes 14f and positioned in the chassis 14 (on the front side of the bottom plate 14a). Accordingly, the cable protector 23 is arranged at the non-holding position in which the holding portions 26 are positioned away from the edge portion of the hole 14e. At this time, as illustrated in FIG. 17, the stopper 29 positioned away from the hole 14e is in contact with the bottom plate 14a, and thus the side portion 31 included in the flange 25 is temporarily elastically deformed. Further, when the cable protector 23 is at the non-holding position, there is a space between the protection portion 24 and a part of the inner surface of the hole 14e that faces a front side of the protection portion 24. The size of this space substantially corresponds to the sliding amount of the cable protector 23. The space is mostly covered with the flange 25, but a part thereof is not covered with the flange 25. By visually checking the part that is not covered with the flange 25, it can be determined if the cable protector 23 is at the non-holding position.

When the cable protector 23 at the non-holding position is slid to the left side in FIG. 13, FIG. 16, and FIG. 17 along the X-axis direction, the slide guiding surface 26a guides the holding portions 26 without being caught on the edge portion of the hole 14e. Thus, the holding portions 26 can be smoothly moved and positioned away from the holding portion insertion holes 14f. As illustrated in FIG. 18 and FIG. 19, when the cable protector 23 is slid to the holding position, the holding portions 26 are held against the edge portion of the hole 14e such that the edge portion of the hole 14e is held between the holding portions 26 and the flange 25. Accordingly, the cable protector 23 cannot be moved from the holding position in the Z-axis direction with respect to the chassis 14. As illustrated in FIG. 20, when the cable protector 23 reaches the holding position, the stopper 29 enters the hole 14e and the side portion 31 is restored. Thus, the stopper 29 is held against the inner surface of the hole 14e. With this configuration, the cable protector 23 cannot be moved from the holding position in the direction opposite to the sliding direction for attachment along the X-axis direction, i.e., the sliding direction of the cable protector 23 for detachment, and thus the cable protector 23 is hardly detached.

While the cable protector 23 is attached to the chassis 14 as above, one end of the flat cable 22 that is in the chassis 14 is inserted to the connector portion 18a on the LED board 18. Then, as illustrated in FIG. 8, the other end of the flat cable 22 is drawn out of the chassis 14 through the insertion hole 24a of the protection portion 24 included in the cable protector 23 and attached to the hole 14e of the chassis 14. The protection portion 24 is positioned between the flat cable 22 and the edge of the hole 14e such that the flat cable 22 is not contact with the hole 14e. Accordingly, even if the edge portion of the hole 14e has the sharp edge, the sharp edge hardly damages the flat cable 22. The drawing of the flat cable 22 is described in detail. When the flat cable 22 is passed through the insertion hole 24a, the flat cable 22 is in contact with the inner surface of the guiding portion 27 (the inclined surface 27a and the perpendicular surface 27b) provided on the rear surface of the protection portion 24. Thus, the flat cable 22 is drawn out of the chassis 14 while being guided in the direction toward the opening of the outlet 32, i.e., diagonally downward in the vertical direction. Then, as illustrated in FIG. 8 and FIG. 9, the flat cable 22 drawn out downward in the vertical direction from the outlet 32 is passed through the space between the pressing portion 28 and the bottom plate 14a while being in contact with the flange 25. Then, the flat cable 22 is further drawn downward in the vertical direction along the bottom plate 14a. The flat cable 22 is bent and suitably tensioned by a step formed between the flange 25 and the pressing portion 28. Further, each end portions of the flat cable 22 in the width direction is pressed against the bottom plate 14a by the pressing portions 28, and thus the flat cable 22 is not unnecessarily moved away from the bottom plate 14a in the Z-axis direction. With this configuration, the flat cable 22 hardly loosens.

After the drawing of the flat cable 22, the reflection sheet 20 is arranged in the chassis 14. Then, the board support member 19 is attached to hold the LED board 18 and the reflection sheet 20. In this state, the rising portion 20b of the reflection sheet 20 covers the cable protector 23 and the connector portion 18b to which the flat cable 22 is inserted, from the front side (FIG. 8). Then, the optical member 15 and the frame 16 are sequentially attached to the chassis 14 while the LED drive board 21 is attached. After the LED drive board 21 is attached to the chassis 14, the other end of the flat cable 22 is inserted to the connector portion 21a. Accordingly, the LED drive board 21 and the LEDs 17 mounted on the LED board 18 are electrically connected to each other. The LED drive board 21 may be attached at a proper time other than the above.

The liquid crystal panel 11 is attached to the backlight unit 12 assembled as above via the bezel 13 to obtain the liquid crystal display device 10. The cabinets Ca, Cb in which the tuner T and the power source P are housed are attached to the liquid crystal display device 10 to obtain the television device TV.

When the liquid crystal display device 10 produced as above is switched on, the main board controls the driving of the liquid crystal panel 11, and the LED drive board 21 controls the driving of each LED 17 based on the signal sent from the main board. Thus, the light emitted from each LED 17 is applied to the liquid crystal panel 11 through the optical member 15, and thus a predetermined image is displayed on the liquid crystal panel 11. The driving of each LED 17 is more specifically described. The LED controller of the LED drive board 21 outputs various control signals based on the signal sent from the main board. Based on the control signals, the LED driver turns on each LED 17 at a predetermined voltage value and a predetermined PWM modulated value through the flat cable 22. In this embodiment, the LED drive board 21 and the LED board 18 are connected to the flat cable 22 including the conducting bodies 22b. The conducting bodies 22b are each connected to each of the wiring portions included in the wiring pattern of the LED board 18. Thus, each of the LEDs 17 can be turned on depending on the connection type of the wiring pattern to each LED 17. Specifically, if the individual-type connection is employed to connect the wiring pattern to each LED 17, each LED 17 on the LED board 18 can be individually turned on, as described above. Thus, the LEDs 17 can have brightness different from each other. If the group-type connection is employed to connect the wiring pattern to each LED 17, the groups of the LEDs 17 can be separately turned on, as described above. Thus, each of the groups of the LEDs 17 can have brightness different from each other. Therefore, when a display area of the liquid crystal panel 11 is divided into a plurality of sections, the LEDs 17 for a relatively dark section can be controlled to have relatively low brightness, and the LEDs 17 for a relatively bright section can be controlled to have relatively high brightness. The contrast is improved by this local dimming in which the amount of light from the backlight unit 12 is controlled for each display section of the liquid crystal panel 11. This provides extremely high display quality.

As illustrated in FIG. 8, the flat cable 22 is protected from the sharp edge of the edge portion of the hole 14e by the protection portion 24, and thus the disconnection hardly occurs. This improves lighting reliability of the LED 17. Further, the insertion hole 24a of the protection portion 24 is smaller than the hole 14e, and thus the light from the LEDs 17 in the chassis 14 hardly leaks to the outside and the dusts outside the chassis 14 hardly enter the chassis 14. The prevention of the leakage of the light from the chassis 14 increases the amount of light used to display the image on the liquid crystal panel 11 (improves use efficiency of light). Thus, the display quality can be improved and the power consumption can be reduced. In addition, the prevention of the entrance of the dusts into the chassis 14 results in the prevention of the attachment of the dusts to optical element (the optical member 15, the LED 17, and the reflection sheet 20). Accordingly, the problems such as uneven brightness and reduction in the brightness may not occur, and thus high display quality can be obtained and the service-life of the product can be longer. In addition, the flange 25 is in contact with the edge portion of the hole 14e of the chassis 14, and thus the space between the protection portion 24 and the hole 14e is closed. Accordingly, the leakage of light and the entrance of dust hardly occur. Further, the guiding portion 27 is positioned above the edge portion of the insertion hole 24c in the vertical direction and the outlet 32 opens diagonally downward in the vertical direction. Thus, the dusts hardly enter the outlet 32. Further, even if the light leaks through the outlet 32 and travels to the outside of the cabinet Cb through the dissipation hole H, the leaked light does not travel toward the upper side in the vertical direction. Thus, the leaked light is hardly noticed by a viewer.

The above-described liquid crystal display device 10 is required to be disassembled for maintenance, repair, or disposal. In disassemble of the liquid crystal display device 10, components thereof are detached in reverse order to the above-described assembling. Particularly, the detachment of the cable protector 23 is described here. As illustrated in FIG. 18 to FIG. 20, with the flat cable 22 detached from the cable protector 23, the cable protector 23 at the holding position is slid in the direction opposite to the sliding direction for attachment along the X-axis direction while the side portion 31 is elastically deformed such that the stopper 29 is away from the inner surface of the hole 14e. As illustrated in FIG. 13, FIG. 16, and FIG. 17, when the cable protector 23 reaches the non-holding position, the holding portions 26 are positioned away from the edge portion of the hole 24e and in the holding portion insertion holes 14f. Then, as illustrated in FIG. 14 and FIG. 15, the cable protector 23 is separated from the bottom plate 14a along the Z-axis direction so that the cable protector 23 is detached from the chassis 14. As described above, the cable protector 23 is easily detached from the chassis 14, and thus the disassembly workability and the recycling efficiency is high compared with the case that the adhesion tape is attached to the edge portion of the hole 14e to prevent the damage of the flat cable, the leakage of light, and the entrance of dusts.

As described above, the backlight unit (the lighting device) 12 according to this embodiment includes the LEDs (the light sources) 17, the flat cables (the flat conductors) 22 connected to the LEDs 17, the chassis 14 including the holes 14e, the cable protectors (the flat conductor protectors) 23 each including the protection portion 24 and the insertion hole 24a extending through the protection portion 24. The chassis 14 houses the LEDs 17. The flat cables 22 are inserted through the corresponding insertion hole 24a. The flat conductor protectors 23 are each arranged such that the protection portion 24 is positioned between the edge of the hole 14e in the chassis 14 and the portion of the flat cable 22 that is positioned in the insertion hole 24a.

In this configuration, the protection portion 24 of the cable protector 23 arranged to pass through the hole 14e in the chassis 14 has the insertion hole 24a extending therethrough. The flat cable 22 connected to the LED 17 housed in the chassis 14 is drawn through the insertion hole 24a to the outside of the chassis 14. Additionally, the protection portion 24 is arranged between the portion of the flat cable 22 that is positioned in the insertion hole 24a and the edge of the hole 14e, and thus the flat cable 22 is not in direct contact with the edge of the hole 14e. With this configuration, the flat cable 22 is hardly damaged, for example. Further, the insertion hole 24a in the protection portion 24 has a smaller opening diameter than the hole 14e. Accordingly, the light from the LED 17 in the chassis 14 hardly leaks from the chassis 14 and the dusts outside the chassis 14 hardly enter the chassis 14. Compared with the case that the adhesion tape or the like is attached to the edge portion of the hole 14e, disassembly workability in repairing or scraping is improved.

The cable protector 23 further includes the pressing portion 28. The pressing portion 28 presses the portion of the flat cable 22 that is positioned outside the chassis 14 toward the chassis 14. In this configuration, the portion of the flat cable 22 that is positioned outside the chassis 14 is pressed toward the chassis 14 by the pressing portion 28, and thus the flat cable 22 hardly loosens.

The portion of the flat cable 22 that is positioned outside the chassis 14 is the liner portion extending in one direction. The pressing portion 28 includes two pressing portions 28. The cable protector 23 is arranged such that each of the pressing portions 28 is positioned at each end in the width direction of the linear portion of the flat cable 22. With this configuration, the flat cable 22 is pressed at each end in the width direction by each of the pressing portions 28, and thus the flat cable 22 hardly loosens.

The cable protector 23 further includes the flange 25. The flange 25 protrudes from the outer surface of the protection portion 24 and faces the edge portion of the hole 14e. The pressing portion 28 extends from the flange 25. In this configuration, the flange 25 protruding from the outer surface of the protection portion 24 faces the edge portion of the hole 14e in the chassis 14, and thus the light hardly leaks through the space between the hole 14e and the protection portion 24, and the dusts or the like hardly enter the space. Further, the pressing portion 28 extends from the flange 25, and thus the arrangement of the pressing portion 28 can be freely determined compared with the case that the pressing portion 28 is provided on the protection portion 24. For example, the pressing portion 28 can be positioned away from the protection portion 24.

The flange 25 is in contact with the edge portion of the hole 14e on the outer surface of the chassis 14. The pressing portions 28 are arranged at positions not overlapping with the flange 25 in a plan view. In this configuration, the flange 25 is in contact with the edge portion of the hole 14e from the outside of the chassis 14. This improves attachment and detachment workability of the cable protector 23. Further, the flat cable 22 arranged outside the chassis 14 through the insertion hole 24a includes a portion extending along the flange 25, but the pressing portion 28 arranged at the position not overlapping with the flange 25 in a plan view press the flat cable 22 between the pressing portion 28 and the cassis 14 without the flange 25 therebetween. This effectively reduces the loosening of the flat cable 22.

The pressing portion 28 is arranged such that the flat cable 22 is bent between the flange 25 and the pressing portion 28. With this configuration, the pressing portion 28 can press the flat cable 22 with the flat cable 22 bent between the pressing portion 28 and the flange 25, and thus the flat cable 22 can have suitable tension. This effectively reduces the loosening of the flat cable 22.

The cable protector 23 further includes the guiding portion 27. The guiding portion 27 is positioned outside the chassis 14 at the position overlapping with the insertion hole 24a. The flat cable 22 to be drawn to the outside of the chassis 14 through the insertion hole 24a is guided by the guiding portion 27 in a specific direction. With this configuration, the guiding portion 27, which is arranged at the position overlapping with the insertion hole 24a, can guide the flat cable 22 to be drawn to the outside of the chassis 14 through the insertion hole 24a, and thus the flat cable 22 can be drawn easily. Additionally, the guiding portion 27 arranged at the position overlapping with the insertion hole 24a in a plan view can properly reduce the leakage of light from the insertion hole 24a and the entrance of the dusts outside the chassis 14 into the insertion hole 24a.

The guiding portion 27 extends from the protection portion 24. The guiding portion 27 has the inner surface continuously extending from the inner surface of the insertion hole 24a. In this configuration, the inner surface of the guiding portion 27 is continuous with the inner surface of the insertion hole 24a, and thus the flat cable 22 can be bent along the inner surfaces of the guiding portion 27 and the insertion hole 24a. This improves the workability for drawing the flat cable 22.

The flat cable 22 is drawn in the vertical direction. The guiding portion 27 and the edge portion of the insertion hole 24a constitute an outlet 32 from which the flat cable 22 is drawn out. The outlet 32 opens downward in the vertical direction. In this configuration, the outlet 32 opens downward in the vertical direction, and thus the dusts or the like outside the chassis 14 hardly enter the chassis 14 through the outlet 32. Further, even if the light leaks from the outlet 32, the leaked light is hardly noticed by a viewer.

The backlight unit 12 further includes the LED board (the light source board) 18 on which the LEDs 17 are mounted and to which the flat cable 22 is connected. With this configuration, the power can be supplied to the LEDs 17 mounted on the LED board 18 by connecting the flat cable 22 to the LED board 18.

The flat cable 22 includes a plurality of conducting bodies 22b arranged parallel to each other. One of the conducting bodies 22b and another one of the conducting bodies 22b are each connected to a separate one of the LEDs 17. In this configuration, some of the conducting bodies 22b are connected to separate LEDs 17, and thus the brightness or the like of each LED 17 can be independently controlled for each conducting body 22b.

The LED board 18 includes a first LED board and a second LED board in the chassis 14. The first LED board and the second LED board are electrically connected to each other to constitute one LED board group (the light source board group) 18G. The flat cable 22 is connected to at least one of the first LED board and the second LED board of the LED board 18. The flat cable 22 includes a plurality of conducting bodies 22b arranged parallel with each other. One of the conducting bodies 22b is connected to the LEDs 17 arranged on the first LED board, and another one of the conducting bodies 22b is connected to the LEDs 17 arranged on the second LED board. In this configuration, the conducting bodies 22b include the conducting body 22b that is connected to the LEDs 17 arranged on the first LED board and the conducting body 22b that is connected to the LEDs 17 arranged on the second LED board, and thus the brightness and the like of the LEDs 17 on each LED board 18 can be independently controlled for each conducting body 22b.

The cable protector 23 further includes the flange 25. The flange 25 protrudes from the outer surface of the protection portion 24 and faces the edge portion of the hole 14e. In this configuration, the flange 25 protruding from the outer surface of the protection portion 24 faces the edge portion of the hole 14e, and thus the light hardly leaks through the space between the hole 14e and the protection portion 24, and the dusts or the like hardly enter the space.

The flange 25 is in contact with the edge portion of the hole 14e on the outer surface of the chassis 14. In this configuration, the flange 25 is brought into contact with the edge portion of the hole 14e from the outside of the chassis 14. This facilitates the attachment and detachment workability of the cable protector 23.

The cable protector 23 further includes the holding portion 26. The holding portion 26 is arranged on the outer surface of the protection portion 24 such that the holding portion 26 holds the edge portion of the hole 14e in the chassis 14 between the holding portion 26 and the flange 25. In this configuration, the edge portion of the hole 14e is held between the holding portion 26 and the flange 25, and thus the cable protector 23 can be fixed to the chassis 14.

The cable protector 23 is selectively positioned at one of the non-holding position and the holding position by being slid in the direction along the plate surface of the chassis 14. When the cable protector 23 is positioned at the non-holding position, the holding portion 26 is away from the edge portion of the hole 14e of the chassis 14. When the cable protector 23 is positioned at the holding position, the holding portion 26 is held against the edge portion of the hole 14e of the chassis 14. In this configuration, when the cable protector 23 at the non-holding position is slid along the plate surface of the chassis 14 to the holding position, the holding portion 26 is held against the edge portion of the hole 14e of the chassis 14, and the edge portion of the hole 14e is positioned between the holding portion 26 and the flange 25. Thus, the cable protector 23 can be fixed to the chassis 14. In the detachment of the cable protector 23 at the holding position from the chassis 14, the cable protector 23 is slid along the direction opposite from the attachment to the non-holding position. Thus, the cable protector 23 can be detached from the chassis 14. Accordingly, the workability for attachment and detachment of the cable protector 23 is high.

The holding portion 26 protrudes from the outer surface of the protection portion 24 in the direction intersecting with the sliding direction in which the cable protector 23 is slid. The chassis 14 further includes the holding portion insertion hole 14f in the edge portion of the hole 14e. The holding portion insertion hole 14f and the hole 14e are communicated with each other. In this configuration, when the cable protector 23 is positioned at the non-holding position, the holding portion 26 is positioned in the holding portion insertion hole 14f. On the other hand, when the cable protector 23 is positioned at the holding position, the holding portion 26 is away from the holding portion insertion hole 14f and held against the edge portion of the hole 14e. Compared with the case that the holding portion protrudes from the outer surface of the protection portion 24 in the sliding direction of the cable protector 23, the arrangement and the number of the holding portions 26 on the holding portion 24 can be freely determined.

The cable protector 23 includes the stopper 29. The stopper 29 is provided on the flange 25. When the cable protector 23 is positioned at the non-holding position, the stopper 29 is positioned outside the hole 14e. When the cable protector 23 is positioned at the holding position, the stopper 29 is positioned in the hole 14e and held against the inner surface of the hole 14e, whereby the cable protector 23 is not allowed to be moved in a direction opposite to the sliding direction for attachment. In this configuration, when the cable protector 23 is slid from the non-holding position to the holding position, the stopper 29 is positioned in the hole 14e and held against the inner surface of the hole 14e, and thus the cable protector 23 is not allowed to be moved in the direction opposite to the sliding direction for attachment.

The flange 25 includes the cutout such that the flange 25 includes a side portion 31. The stopper 29 is provided on the side portion 31. In this configuration, when the cable protector 23 is positioned at the non-holding position, the stopper 29 is positioned outside the hole 14e, but the side portion 31 positioned outside the hole 14e is elastically deformed when the stopper 29 comes in contact with the chassis 14, because the side portion 31 on which the stopper 29 is provided has the free end. Then, when the cable protector 23 is slid to the holding position, the side portion 31 is restored such that the stopper 29 is positioned in the hole 14e and held against the inner surface of the hole 14e. Thus, the cable protector 23 is fixed.

Second Embodiment

The second embodiment of the present invention will be described with reference to FIG. 21 or FIG. 22. In the second embodiment, the attachment structure of a cable protector 123 to a chassis 114 is changed. Similar configurations, operations, and effects to those of the first embodiment will not be described.

Figure 21:
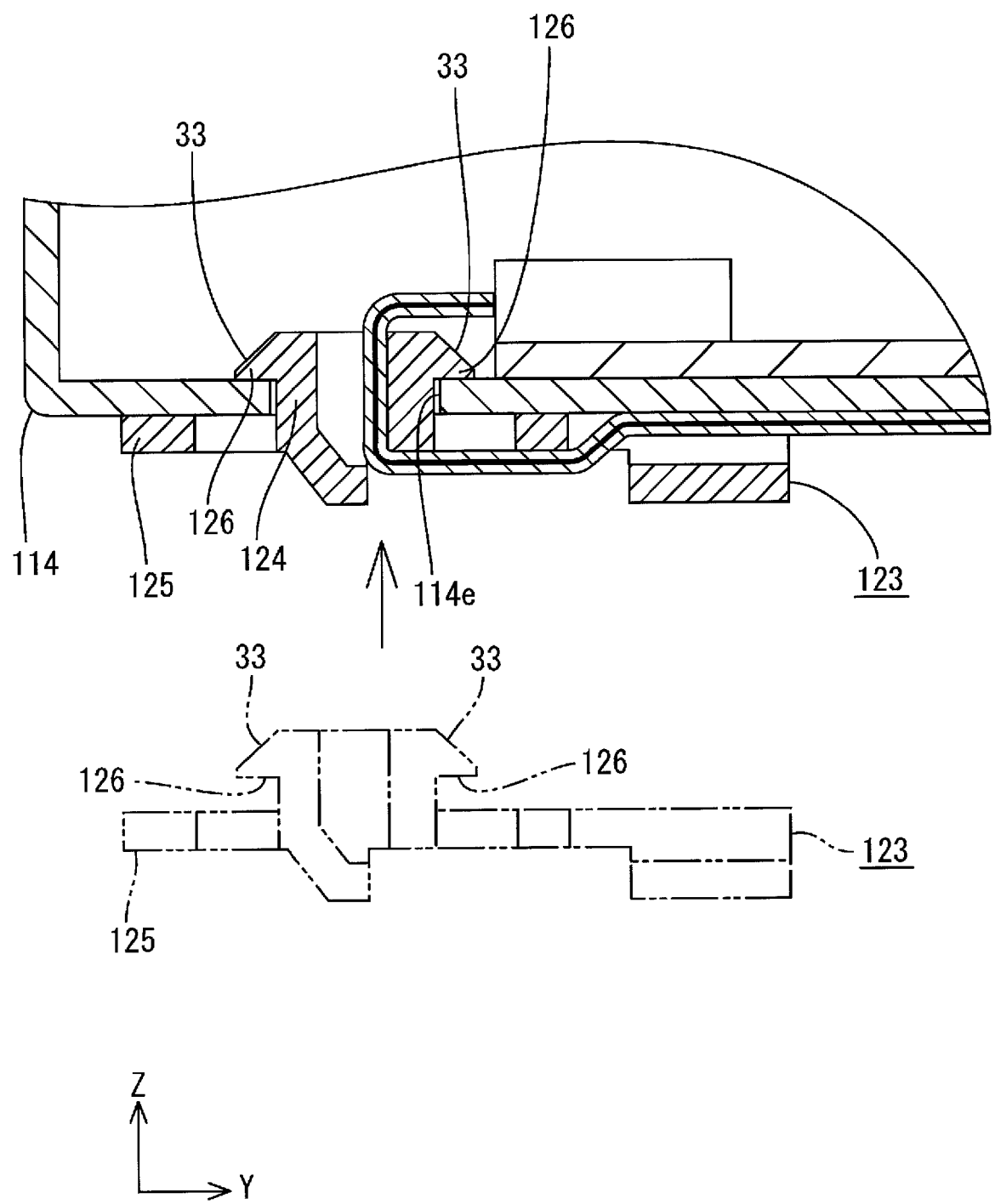
FIG. 21 is a cross-sectional view of a liquid crystal display device according to the second embodiment of the present invention taken along the short-side direction thereof, the flat cable and the cable protector being magnified.
Figure 22:
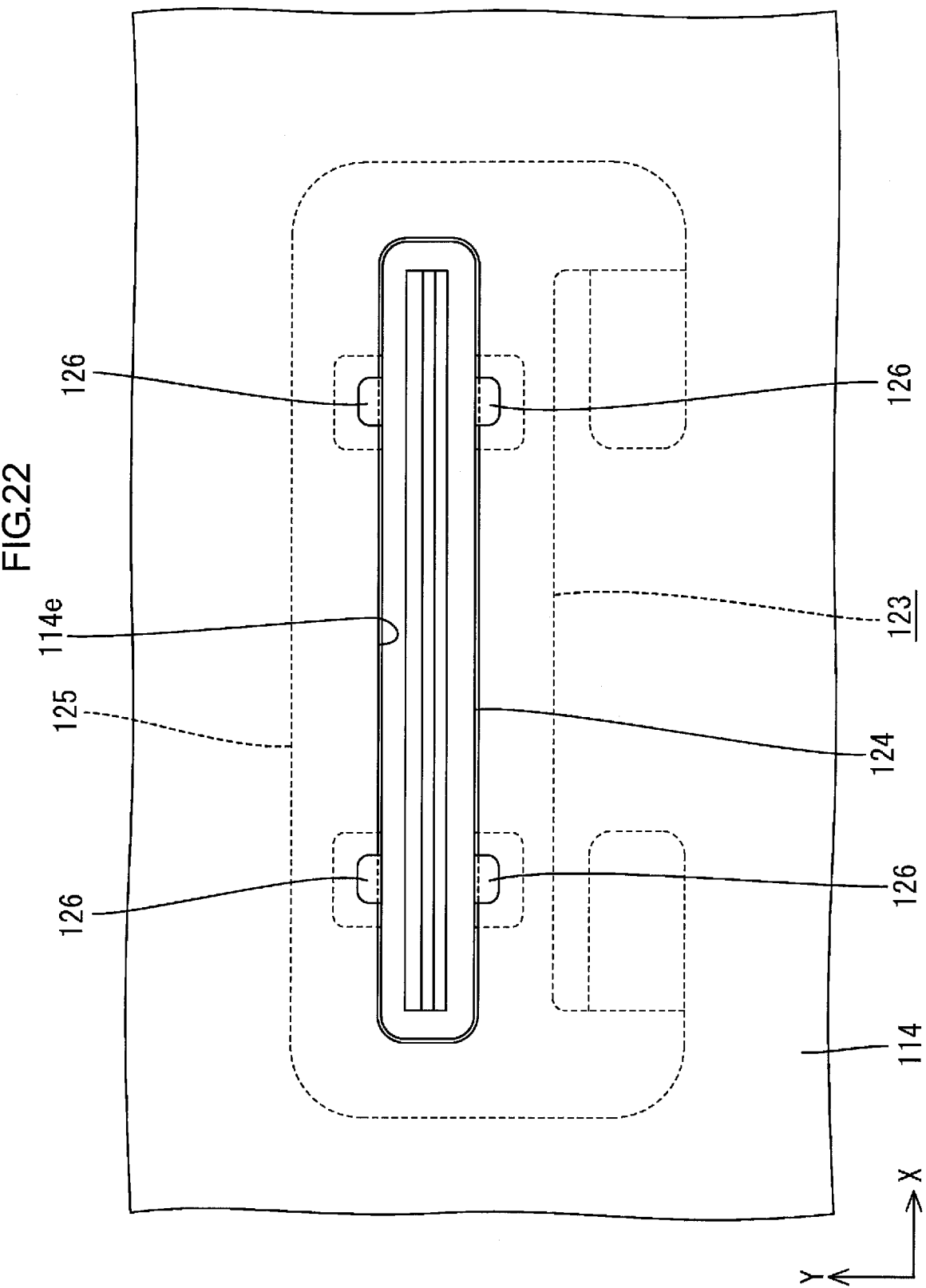
FIG. 22 is a plan view illustrating a state that the cable protector is attached to the chassis.

As illustrated in FIG. 21 and FIG. 22, the cable protector 123 according to this embodiment is pushed into a hole 114e in the chassis 114 in the Z-axis direction, and thus is attached to the chassis 114. Unlike the first embodiment, the hole 114e and the cable protector 123 do not include the holding portion insertion hole 14f, the stopper 29, the cutout 30, and the side portion 31 (see FIG. 18 and FIG. 20), which are included in the first embodiment. Specifically, the hole 114e has the outer shape substantially the same as that of the protection portion 124 of the cable protector 123 in a plan view. The hole 114e is large enough so that the protection portion 124 is inserted and removed therethrough. The cable protector 123 (particularly a flange 125) is substantially symmetric with respect to the center line passing through the middle of the cable protector 123 in the X-axis direction. The holding portion 126 protrudes outwardly in the Y-axis direction from the outer surface on each long side of the protection portion 124. The holding portion 126 overlaps with the edge portions of the hole 114e in a plan view when the protection portion is positioned in the hole 114e. A surface of each holding portion 126 that faces the front side, i.e., a surface of each holding portion 126 that is positioned at a front side in the direction in which the cable protector 123 is pushed against the chassis 114, includes a pushing guiding surface 33 which is tapered. In FIG. 21, the cable protector 123 that is not attached is indicated by a two-dot chain line.

In the attachment of the cable protector 123 to the chassis 114, the protection portion 124 is positioned so as to correspond to the position of the hole 114e. Then, the cable protector 123 is pushed to the front side in the Z-axis direction. At this time, the pushing guiding surface 33 of each holding portion 126 is slid along the edge portion of the hole 114e, and thus the holding portions 126 can be smoothly passed through the hole 114e. When the cable protector 123 is pushed to a position at which the flange 125 comes in contact with the rear surface of the edge portion of the hole 114e, the holding portion 126 are passed through the hole 114e to the front side of the bottom plate 114a and held on the edge portion of the hole 114e. Accordingly, the cable protector 123 is fixed to the chassis 114. When the cable protector 123 is detached from the chassis 114, the holding portions 126 are forcibly separated from the edge portion of the hole 114e with a tool, and the cable protector 123 is pulled to the rear side, and thus the cable protector 123 is detached.

As described above, according to this embodiment, the cable protector 123 is pushed against the chassis 114 in the direction intersecting with the plate surface of the chassis 114, whereby the cable protector 123 is fixed to the chassis 114. In this configuration, the cable protector 123 is pushed in the direction intersecting with the plate surface of the chassis 114, and thus the edge portion of the hole 114e is held between the flange 125 and the holding portion 126. This enables the cable protector 123 to be fixed to the chassis 114. In the first embodiment, the cable protector 23 is attached to the chassis 14 by being slid in the direction along the plate surface of the chassis 14. In such a configuration, the hole 14e needs to have a larger diameter than the outer diameter of the protection hole 224. However, this is not required for the above configuration. Thus, the hole 114e can be relatively small, and the leakage of light and the entrance of dusts hardly occur.

Third Embodiment

The third embodiment of the present invention will be described with reference to FIG. 23 or FIG. 24. In the third embodiment, the attachment structure of a cable protector 223 to a chassis 214 is changed from the second embodiment. Similar configurations, operations, and effects to those of the second embodiment will not be described.

Figure 23:
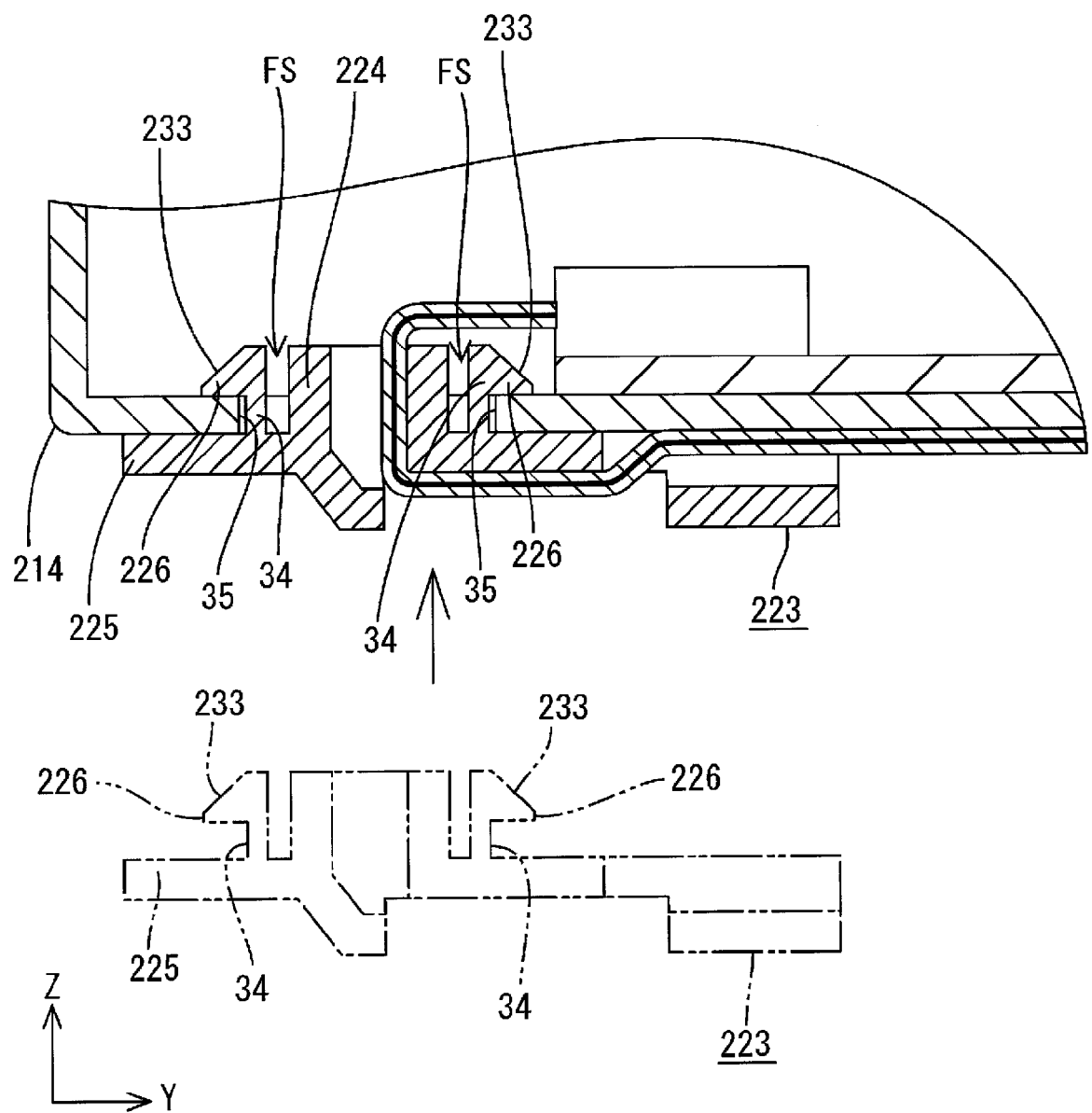
FIG. 23 is a cross-sectional view of a liquid crystal display device according to the third embodiment of the present invention taken along the short-side direction thereof, the flat cable and the cable protector being magnified.
Figure 24:
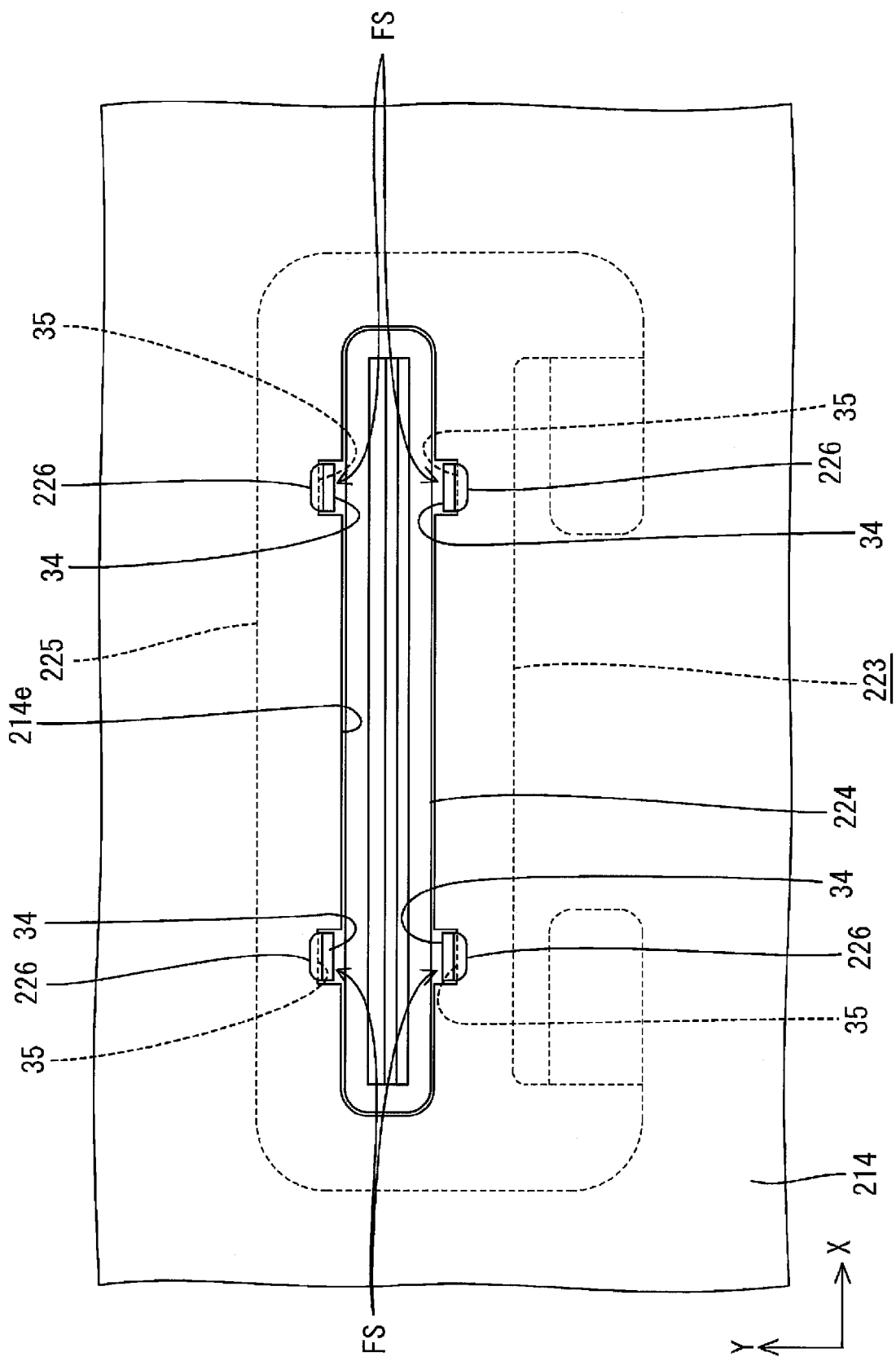
FIG. 24 is a plan view illustrating a state that the cable protector is attached to the chassis.

As illustrated in FIG. 23 and FIG. 24, holding portions 226 included in the cable protector 223 according to this embodiment are each provided on an elastic piece 34 provided on a flange 225. Specifically, two elastic pieces 34 are provided on each long-side portion of the flange 225. The elastic pieces 34 have a fixed end and a free end. The elastic pieces 34 each protrude from the flange 225 to the front side in the Z-axis direction. The elastic pieces 34 are arranged to face the protection portion 224 in the Y-axis direction with a predetermined distance therebetween. The space between the elastic pieces 34 and the protection portion 224 is a space FS that allows the elastic piece 34 to be deformed. The holding portions 226 are provided on an outer surface of the elastic piece 34 that is positioned farthest from the flange 225 (a surface opposite to an inner surface that faces the protection portion 224). The holding portion 226 protrudes outwardly from the elastic piece 34 in the Y-axis direction. Further, the holding portion 226 includes a pushing guiding surface 233 similar to the second embodiment. The chassis 214 includes elastic piece insertion holes 35 on the edge portion of the hole 214e in the chassis 214. The elastic piece insertion holes 35 communicates with the hole 214e and through which the above-described elastic pieces 34 are passed. Two elastic piece through holes 35 are provided on each long-side edge portion of the hole 214e with a predetermined distance therebetween in the X-axis direction. The elastic piece through holes 35 are arranged to overlap with the elastic pieces 34 (FIG. 24).

In the attachment of the cable protector 223 to the chassis 214, the protection portion 224 and the elastic pieces are positioned so as to correspond to the positions of the hole 114e and the elastic piece insertion holes 35, respectively. Then, the cable protector 223 is pushed to the front side in the Z-axis direction. At this time, the pushing guiding surface 233 of each holding portion 226 is slid against the edge portion of the hole 214e, and thus the elastic pieces 34 are pressed toward the protection portion 224 and elastically deformed to be temporary positioned in the space FS. When the cable protector 223 is pushed to a position at which the flange 225 comes in contact with the rear surface of the edge portion of the hole 214e, the holding portions 226 are passed through the hole 214e to the front side of the bottom plate 214a. At this time, the elastic pieces 34 are restored, and thus the holding portions 26 are held against the edge portion of the hole 114e. Thus, the edge portion of the hole 214e are held between the flange 225 and the holding portions 226. Accordingly, the cable protector 223 is fixed to the chassis 214. When the cable protector 223 is detached from the chassis 214, the holding portions 226 are forcibly deformed and separated from the edge portion of the hole 214e with a tool. Then, the cable protector 223 is pulled to the rear side, and thus the cable protector 223 is detached.

As described above, according to this embodiment, the cable protector 223 further includes the elastic piece 34 that is elastically deformable. The elastic piece 34 protrudes from the flange 225 toward the chassis 214. In this configuration, when the cable protector 223 is attached or detached with respect to the chassis 214, the elastic piece 34 is elastically deformed, and thus the holding portion 226 can be easily passed through the hole 214e. This improves the attachment and detachment workability of the cable protector 223 with respect to the chassis 214.

Fourth Embodiment

The fourth embodiment of the present invention will be described with reference to FIG. 25 or FIG. 26. In the fourth embodiment, the number of LED boards 318, the connection type of a flat cable 322 to an LED drive board 321, and the number of cable protectors 223 are changed from the first embodiment. Similar configurations, operations, and effects to those of the first embodiment will not be described.

Figure 25:
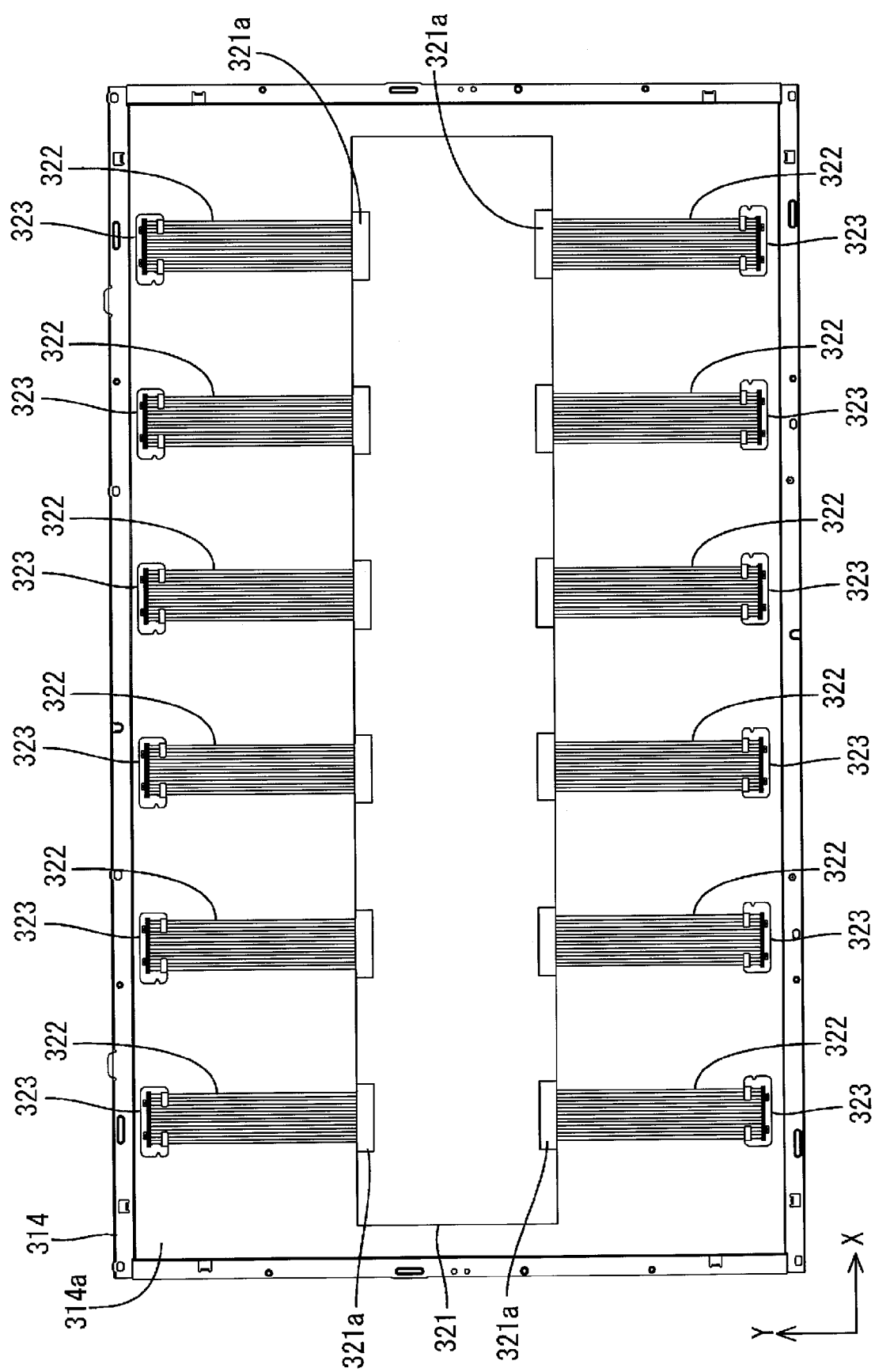
FIG. 25 is a bottom view a chassis included in a liquid crystal display device according to the fourth embodiment of the present invention, the view illustrating a positional relation among a flat cable, a cable protector, and an LED drive board.
Figure 26:
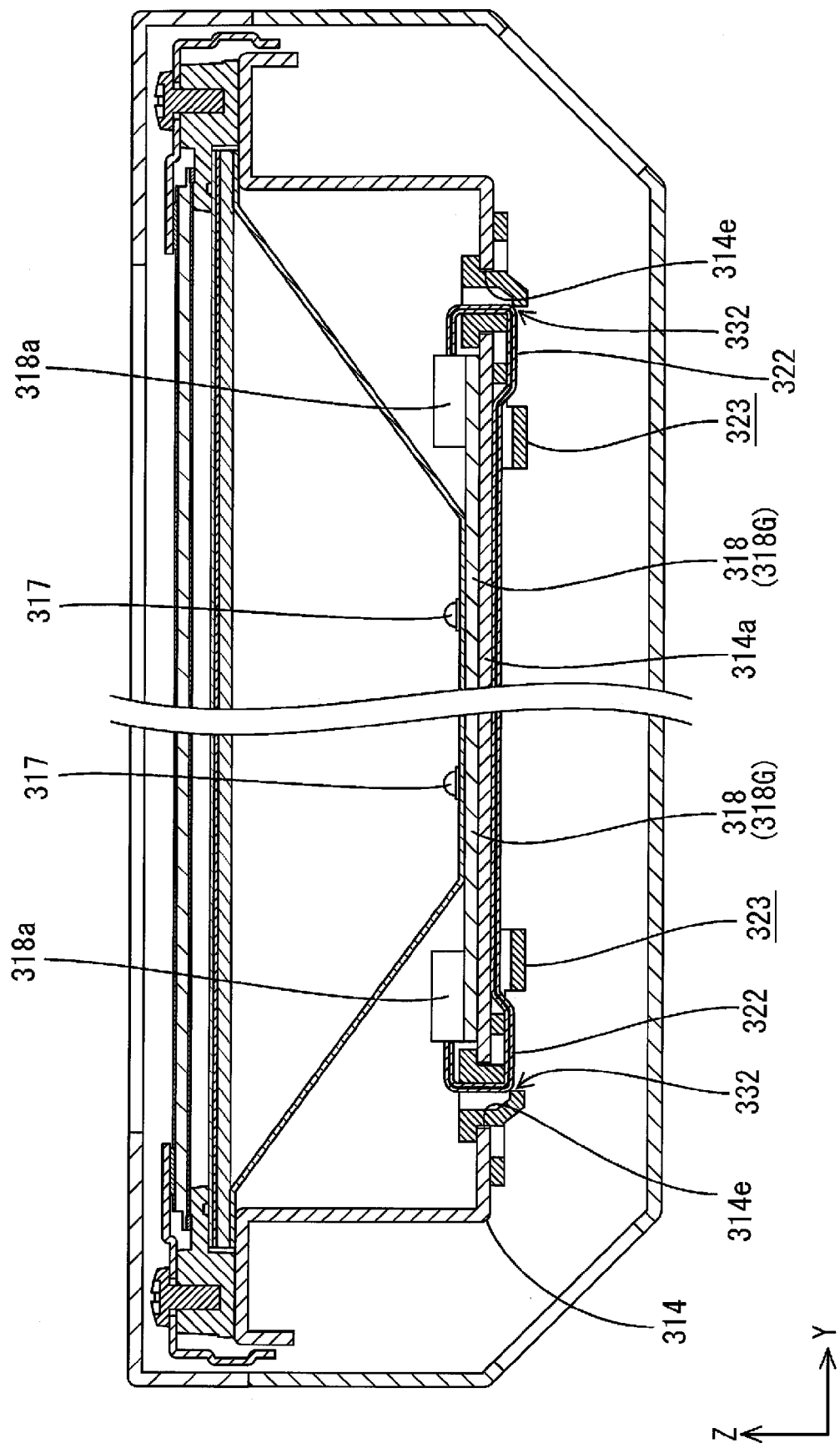
FIG. 26 is a cross-sectional view of the liquid crystal display device taken along the short-side direction, the flat cable and the cable protector being magnified.

As illustrated in FIG. 25 and FIG. 26, two flat cables 322 are provided for each LED board group 318G. A connector portion 318a is provided on each of two LED boards 318 included in the LED board group 318G. Each of the flat cables 322 is inserted into each of the connector portions 318a. Further, pairs of connector portions 321a into which the flat cable 322 is inserted are provided on long-side end portions of an LED drive board 321 along the X-axis direction. The number of the pairs of the connector portions 321a corresponds to that of the LED board groups 318G. The flat cable 322 and the connectors 318a, 321a positioned on one of the upper side and the lower side in the vertical direction is an input unit, and the flat cable 322 and the connectors 318a, 321a on the other side is an output unit. Accordingly, the power can be supplied to each LED 317. A bottom plate 314a of the chassis 314 includes pairs of holes 314e in the upper and lower end portions in the vertical direction. The flat cables 322 are passed through the holes 314e. A pair of holes 314e is provided for one LED board group 318G. Each of the cable protectors 323 is attached to each of the holes 314e. Each cable protector 323 includes an outlet 332 for the flat cable 322. The outlet 332 opens diagonally toward the middle side in the vertical direction.

Fifth Embodiment

The fifth embodiment of the present invention will be described with reference to FIG. 27 or FIG. 28. In the fifth embodiment, the arrangement of LED boards 418, flat cables 422, and an LED drive board 421 is changed from the above first embodiment, for example. Similar configurations, operations, and effects to those of the first embodiment will not be described.

Figure 27:
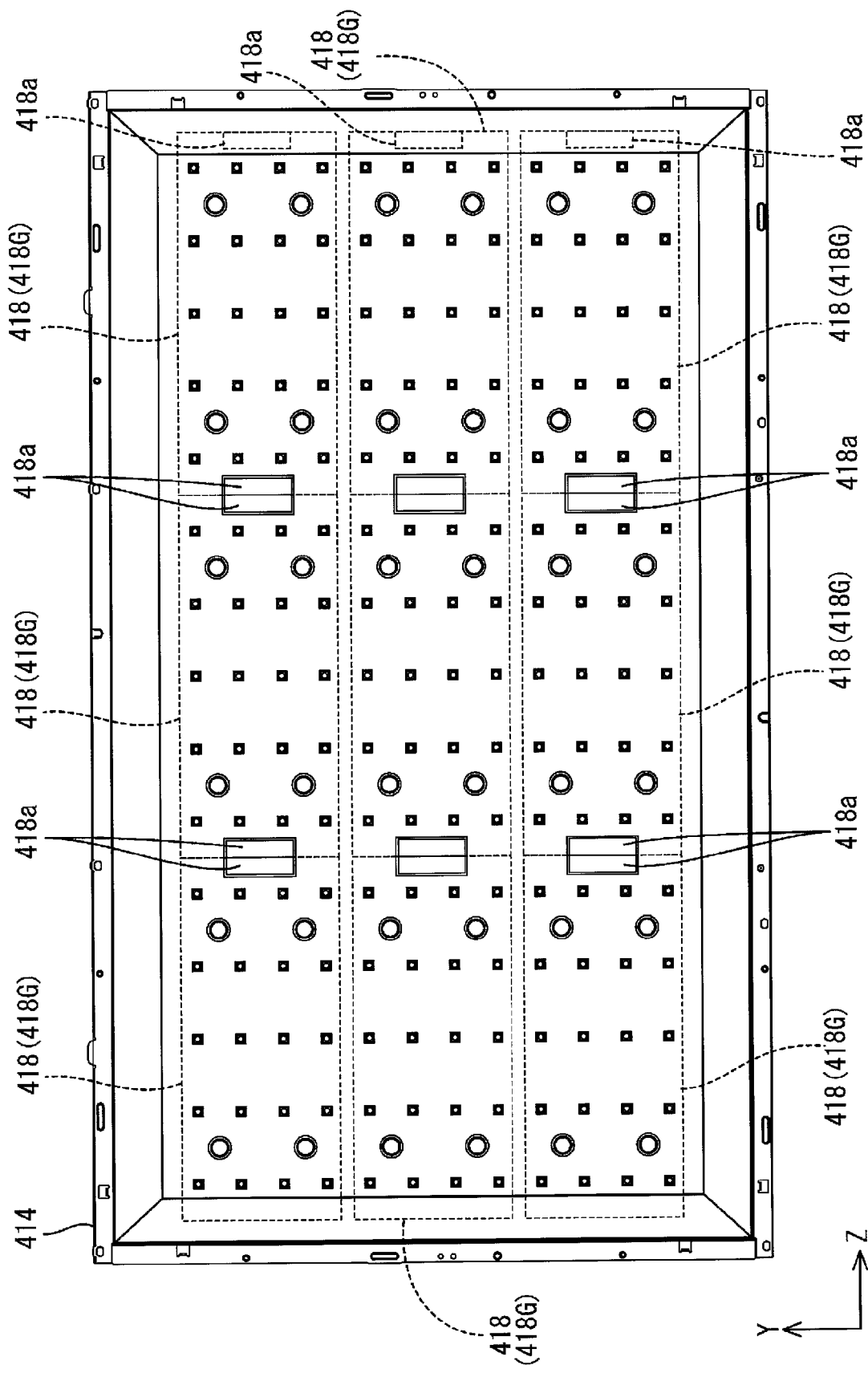
FIG. 27 is a plan view of a chassis included in a liquid crystal display device according to the fifth embodiment of the present invention, the view illustrating a positional relation among LEDs, an LED board, a reflective sheet, and board support members.
Figure 28:
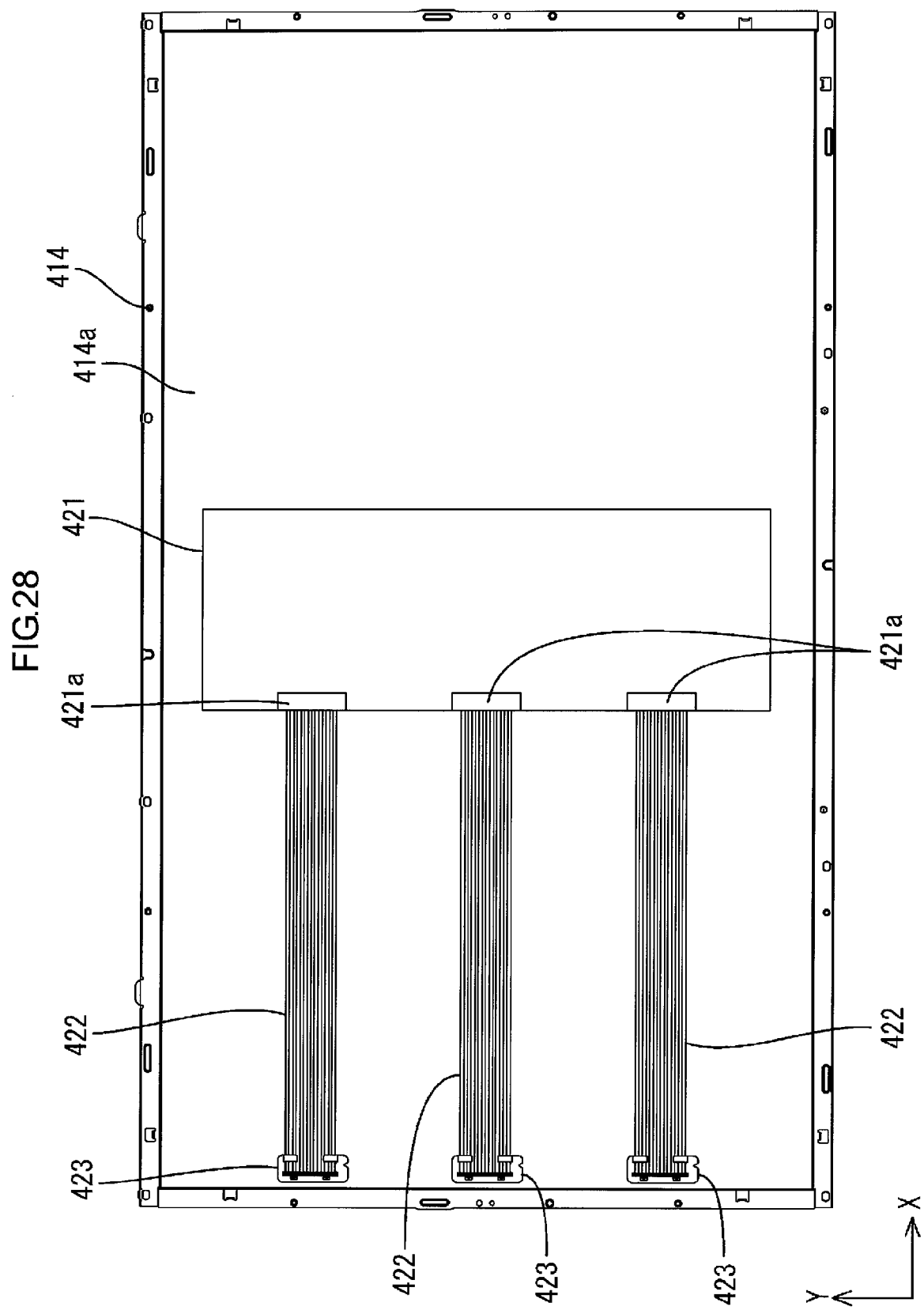
FIG. 28 is a bottom view of the chassis included in the liquid crystal display device, the view illustrating a positional relation among flat cables, cable protectors, and an LED drive board.

As illustrated in FIG. 27, the LED board 418 according to this embodiment has a landscape quadrangular shape in a plan view. A long-side direction of the LED board 418 matches the X-axis direction and a short-side direction thereof matches the Y-axis direction. Three LED boards 418 are arranged in the X-axis direction in the chassis 414, and the LED boards 418 constitute one LED board group 418G. The LED boards 418 included in the LED board group 418G are connected each other by connectors 418a. To one of the connectors 418a that is arranged at an end portion of one of the LED boards 418 on the most distal end, one end of the flat cable 422 is connected. Three LED board groups 418G are arranged in the Y-axis direction with predetermined distances therebetween. As illustrated in FIG. 28, the bottom plate 414a of the chassis 414 includes three holes 414e (in the same number as the LED board group 418G) at one end portion in the X-axis direction of the bottom plate 414a. The flat cable 422 is passed through each hole 414e. To each hole 414e, the cable protector 423 is attached. The flat cable 422 is arranged to extend in the X-axis direction. The LED drive board 421 has a portrait quadrangular shape in a plan view. The long-side direction of the LED drive board 421 matches the Y-axis direction and the short-side direction thereof matches the X-axis direction. Three connectors 421a are provided on one of long-side edge portions of the LED drive board 421 along the Y-axis direction. The other end of the flat cable 421 is inserted into each of the connectors 421a.

Sixth Embodiment

The sixth embodiment of the present invention will be described with reference to FIG. 29 or FIG. 30. Unlike the above first embodiment, the sixth embodiment includes a diffuser lens 36 on an LED board 518. The diffuser lens 36 is a separate member from an LED 517. Similar configurations, operations, and effects to those of the first embodiment will not be described.

Figure 29:
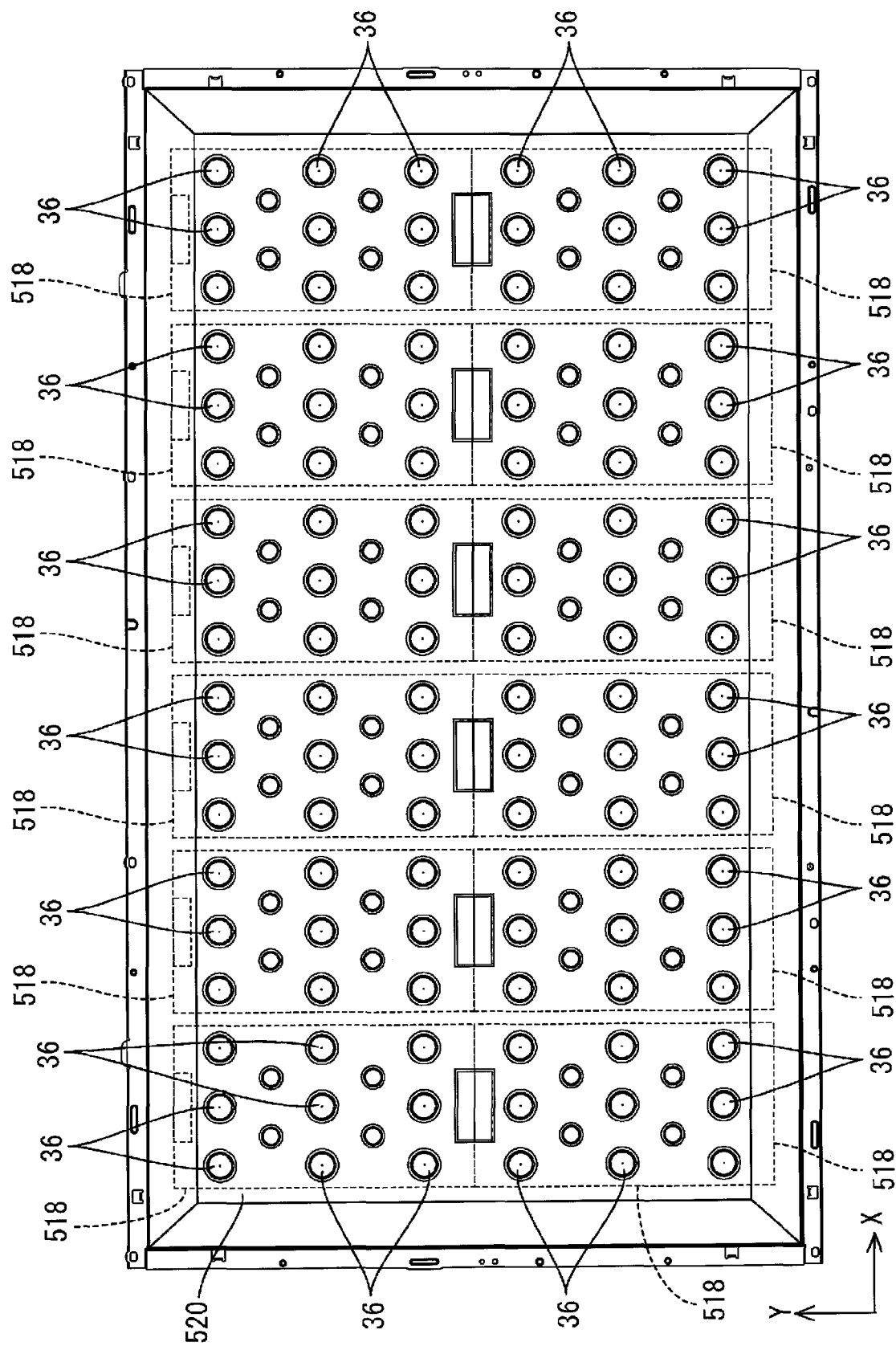
FIG. 29 is a plan view of a chassis included in a liquid crystal display device according to the sixth embodiment of the present invention, the view illustrating a positional relation among LEDs, diffuser lens, LED boards, a reflection sheet, and board support members.

As illustrated in FIG. 29 and FIG. 30, the diffuser lens 36 is provided to cover a light emitting surface of each LED 517 arranged on the LED board 518 of this embodiment. The diffuser lens 36 has a disc-like shape that has a larger diameter than the LED 517. The diffuser lens 36 is coaxially arranged with the LED 517. The light emitting surface of the diffuser lens 36 has a hemispherical shape with a flat top surface. The flat top surface includes a recess on a middle portion thereof. The light from the LED 517 can be deflected at a surface of the recess to be scattered. A reflection sheet 520 includes lens insertion holes having a size large enough to pass the LEDs 517 and the diffuser lens 36.

OTHER EMBODIMENTS

The present invention is not limited to the above embodiments described in the above description and the drawings. The following embodiments are also included in the technical scope of the present invention, for example.

(1) In the above-described embodiments, the flat cable protector is attached from the outside of the chassis such that the flange comes in contact with the outer surface of the edge portion of the hole in the chassis. However, according to the present invention, the flat cable protector may be attached from an inside of the chassis such that the flange comes in contact with an inner surface of the edge portion of the hole in the chassis.

(2) In the above embodiments, the pressing portion included in the cable protector extends from the extended portion provided on the flange. However, the extended portion may not be provided and the pressing portion may directly extend from the main body of the flange. Further, the pressing portion may not extend from the flange, and may directly extend from the protection portion.

(3) In the above embodiments, the pressing portion included in the cable protector is arranged so as not to overlap with the flange in a plan view. However, according to the present invention, the pressing portion may be arranged to overlap with the flange in a plan view such that the flat cable is held between the flange and the pressing portion.

(4) In the above embodiments, two pressing portions included in the cable protector are each arranged at a position corresponding to each end of the flat cable in the width direction. However, according to the present invention, only one pressing portion may be provided on one end of the flat cable in the width direction. Further, according to the present invention, the pressing portion may extend from one of the extended portions to the other one of the extended portion of the flange, for example.

(5) In the above embodiments, the guiding portion included in the cable protector extends from the protection portion. However, according to the present invention, the guiding portion may extend from the flange.

(6) In the above embodiments, the guiding portion included in the cable protector is provided over the long-side portion of the protection portion. However, according to the present invention, the guiding portion may include a plurality of guiding portions and the guiding portions may be provided on the long-side portion with predetermined distances therebetween. Further, according to the present invention, one guiding portion that is shorter than the long-side portion of the protection portion may be provided. Further, the guiding portion may be provided on a short-side portion in addition to the long-side portion.

(7) In the above embodiments, the flange included in the cable protector is in contact with the plate surface (the outer surface) of the chassis when the cable protector is attached to the chassis. However, the flange may not be in contact with the plate surface of the chassis when the cable protector is attached to the chassis.

(8) In the above first embodiment, the cable protector is configured to be slid along the longitudinal direction (the long-side direction) of the protection portion. However, the cable protector may be configured to be slid along the width direction (the short-side direction).

(9) In the above first embodiment, the cable protector is configured to be slid along the horizontal direction (the X-axis direction). However, the cable protector may be configured to be slid along the vertical direction (the Y-axis direction).

(10) In the above first embodiment, the protection portion included in the cable protector protrudes from the outer surface on the long side of the protection portion in the direction perpendicular to the sliding direction. However, the holding portion may protrude from the outer surface on the short side of the protection portion in the sliding direction.

(11) In the above first embodiment, the flange of the cable protector includes the side portion and the stopper provided on the side portion. However, the side portion may be provided separately from the flange, and the stopper may be provided on such a side portion.

(12) In the above second and third embodiments, the holding portions included in the cable protector protrude from the long-side outer surface of the protection portion. However, according to the present invention, the holding portions may protrude from the short-side outer surface of the protection portion.

(13) In the third embodiment, the elastic piece included in the cable protector extends from the flange. However, according to the present invention, the elastic piece may extend from the protection portion. Further, apart of the protection portion may be cut to form the elastic piece.

(14) The attachment structure of the cable protector described in the above second and third embodiments may be applied to the fourth to sixth embodiments. Further, the connection structure of the flat cable described in the fourth embodiment may be applied to the above second and third embodiments, and the fifth and sixth embodiments. Further, the arrangement of the LED boards described in the above fifth embodiment may be applied to the above second to fourth and sixth embodiments. Further, the configuration of the LED boards described in the above sixth embodiment may be applied to the above second to fifth embodiments.

(15) In the above first embodiment, one LED board group includes two LED boards adjacent to each other in the Y-axis direction. However, the LED board group may include three LED boards aligned in the Y-axis direction. In addition, other than six, the number of the LED board groups aligned in the X-axis direction may be five or less, or seven or more.

(16) The fifth embodiment employs the LED board group including three LED boards aligned in the X-axis direction. However, the LED board group may include two LED boards or four or more LED boards aligned in the X-axis direction. In addition, other than three, the number of the LED board groups aligned in the Y-axis direction may be two, or four or more.

(17) In the above embodiments, one flat cable is connected to the LED board group including the LED boards connected to each other. However, the LED boards may not be connected to each other and the flat cable may be independently connected to each LED board.

(18) The above embodiments employ the backlight unit performing the local dimming in which the brightness is individually controlled for each LED or each LED group. However, all of the LEDs may be turned on at the same brightness.

(19) The size, shape, number, or the like of the LED board may be suitably changed from those of the above embodiments. Further, the number, arrangement, or the like of the LEDs mounted on the LED board may be suitably changed.

(20) The above embodiments employ FFC as the flat cable. However, a flexible cable such as FPC (Flexible Printed Circuit) and the like may be used as the flat cable.

(21) In the above embodiments, the liquid crystal panel is arranged in a vertical position such that the short-side direction thereof matches the vertical direction. However, the liquid crystal panel may be arranged in a vertical position such that the long-side direction matches the vertical direction.

(22) In the above embodiments, TFTs are used as switching components of the liquid crystal display device. However, the technology described above can be applied to liquid crystal display devices including switching components other than TFTs (e.g., thin film diode (TFD)). Further, the technology can be applied to not only color liquid crystal display devices but also black-and-white liquid crystal display devices.

(23) In the above embodiments, the liquid crystal display device includes the liquid crystal panel as a display panel. However, the technology can be applied to display devices including other types of display panel.

(24) In the above embodiments, the television device including a tuner is used. However, the technology can be applied to a display device without a tuner.

EXPLANATION OF SYMBOLS

10: liquid crystal display device (display device), 11: liquid crystal panel (display panel), 12: backlight unit (lighting device), 14, 114, 214, 314, 414: chassis, 14e, 114e, 214e, 314e: hole, 14f: holding portion insertion hole, 17, 317, 517: LED (light source), 18, 318, 418, 518: LED board (light source board), 18G, 318G, 418G: LED board group (light source board group), 22, 322, 422: flat cable (flat conductor), 22b: conducting body, 23, 123, 223, 323, 423: cable protector (flat conductor protector), 24, 124, 224: protection portion, 24a: insertion hole, 25, 125, 225: flange, 26, 126, 226: holding portion, 27: guiding portion, 28: pressing portion, 29: stopper, 30: cutout, 31: side portion, 32, 332: outlet, 34: elastic piece, TV: television device

The invention claimed is:

1. A lighting device comprising:
   a light source;
   a flat conductor connected to the light source;
   a chassis including a hole, the chassis housing the light source; and
   a flat conductor protector including a protection portion and an insertion hole extending through the protection portion, the insertion hole through which the flat conductor being inserted, the flat conductor protector being arranged such that the protection portion is positioned between an edge of the hole in the chassis and a portion of the flat conductor that is positioned in the insertion hole, wherein
   the flat conductor protector further includes a pressing portion, the pressing portion pressing a portion of the flat conductor that is positioned outside the chassis toward the chassis.

2. The lighting device according to claim 1, wherein the portion of the flat conductor positioned outside the chassis is a linear portion extending in one direction,
   the pressing portion includes two pressing portions, and
   the flat conductor protector is arranged such that each of the pressing portions is positioned at each end in a width direction of the linear portion of the flat conductor.

3. The lighting device according to claim 1, wherein
   the flat conductor protector further includes a flange, the flange protruding from an outer surface of the protection portion and facing an edge portion of the hole, and
   the pressing portion extends from the flange.

4. The lighting device according to claim 3, wherein the flange is in contact with the edge portion of the hole on an outer surface of the chassis, and
   the pressing portion is arranged at a position not overlapping with the flange in a plan view.

5. The lighting device according to claim 4, wherein the pressing portion is arranged such that the flat conductor is bent between the flange and the pressing portion.

6. The lighting device according to claim 1, wherein
   the flat conductor protector further includes a guiding portion, the guiding portion being positioned outside the chassis at a position overlapping with the insertion hole, and
   the flat conductor to be drawn to an outside of the chassis through the insertion hole is guided by the guiding portion in a specific direction.

7. The lighting device according to claim 6, wherein
   the guiding portion extends from the protection portion, and
   the guiding portion has an inner surface continuously extending from an inner surface of the insertion hole.

8. The lighting device according to claim 6, wherein
   the flat conductor is drawn in a vertical direction,
   the guiding portion and the edge portion of the insertion hole constitute an outlet from which the flat conductor is drawn out, and
   the outlet opens downward in the vertical direction.

9. The lighting device according to claim 1, wherein
   the light source includes a plurality of light sources, and
   the lighting device further includes a light source board on which the light sources are mounted and to which the flat conductor is connected.

10. The lighting device according to claim 9, wherein the flat conductor includes a plurality of conducting bodies arranged parallel to each other, and
    one of the conducting bodies and another one of the conducting bodies are each connected to a separate one of the light sources.

11. The lighting device according to claim 9, wherein
    the light source board includes a first light source board and a second light source board in the chassis, the first light source board and the second light source board are electrically connected to each other to constitute one light source board group,
    the flat conductor is connected to at least one of the first light source board and the second light source board, and
    the flat conductor includes a plurality of conducting bodies arranged parallel with each other, one of the conducting bodies being connected to the light sources arranged on the first light source board, another one of the conducting bodies being connected to the light sources arranged on the second light source board.

12. The lighting device according to claim 1, wherein the flat conductor protector further includes a flange, the flange protruding from an outer surface of the protection portion and facing the edge portion of the hole.

13. The lighting device according to claim 12, wherein the flange is in contact with the edge portion of the hole on an outer surface of the chassis.

14. The lighting device according to claim 12, wherein the flat conductor protector further includes a holding portion, the holding portion being arranged on an outer surface of the protection portion such that the holding portion holds the edge portion of the hole between the holding portion and the flange.

15. The lighting device according to claim 14, wherein
the flat conductor protector is selectively positioned at one of a non-holding position and a holding position by being slid in a direction along a plate surface of the chassis,
when the flat conductor protector is positioned at the non-holding position, the holding portion is away from the edge portion of the hole, and
when the flat conductor protector is positioned at the holding position, the holding portion is held against the edge portion of the hole.

16. The lighting device according to claim 15, wherein
the holding portion protrudes from the outer surface of the protection portion in a direction intersecting with a sliding direction in which the flat conductor protector is slid,
the chassis further includes a holding portion insertion hole in the edge portion of the hole, the holding portion insertion hole and the hole being communicated with each other, and
when the flat cable protector is positioned at the non-holding position, the holding portion is positioned in the holding portion insertion hole.

17. The lighting device according to claim 15, wherein
the flat conductor protector further includes a stopper, the stopper being provided on the flange,
when the flat conductor protector is positioned at the non-holding position, the stopper is positioned outside the hole, and
when the flat conductor protector is positioned at the holding position, the stopper is positioned in the hole and held against an inner surface of the hole, whereby the flat conductor protector is not allowed to be moved in a direction opposite to a sliding direction for attachment in which the flat conductor protector is slid so as to be attached to the chassis.

18. A display device comprising:
the lighting device according to claim 1; and
a display panel configured to display using light emitted from the lighting device.

19. A television device comprising the display device according to claim 18.

* * * * *